US012103828B2

(12) United States Patent
Zhan et al.

(10) Patent No.: US 12,103,828 B2
(45) Date of Patent: Oct. 1, 2024

(54) WINCH, ROPE GUIDE AND TRANSMISSION DEVICE HAVING CLUTCH FUNCTION

(71) Applicant: T-MAX (HANGZHOU) TECHNOLOGY CO., LTD., Hangzhou (CN)

(72) Inventors: Yongyong Zhan, Hangzhou (CN); Xinfa Du, Hangzhou (CN); Songfeng Wang, Hangzhou (CN); Yiming Wang, Hangzhou (CN); Tao He, Hangzhou (CN); Hongliang Xu, Hangzhou (CN)

(73) Assignee: T-MAX (HANGZHOU) TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/335,980

(22) Filed: Jun. 15, 2023

(65) Prior Publication Data

US 2023/0331525 A1 Oct. 19, 2023

Related U.S. Application Data

(62) Division of application No. 16/737,667, filed on Jan. 8, 2020, now Pat. No. 11,713,223.

(30) Foreign Application Priority Data

Feb. 28, 2019 (CN) ......................... 201910149487.2
Feb. 28, 2019 (CN) ......................... 201910149493.8
(Continued)

(51) Int. Cl.
*B66D 1/38* (2006.01)
*B66D 1/12* (2006.01)

(52) U.S. Cl.
CPC . *B66D 1/38* (2013.01); *B66D 1/12* (2013.01)

(58) Field of Classification Search
CPC ... B66D 1/36; B66D 1/38; B66D 1/50; B66D 1/7468; B66D 1/7478
See application file for complete search history.

(56) References Cited

U.S. PATENT DOCUMENTS 7,591 A 8/1850 Burdett
634,385 A 10/1899 Wolfe et al.
(Continued)

FOREIGN PATENT DOCUMENTS

CN 203728468 U 2/2014
CN 104925691 A 9/2015
(Continued)

OTHER PUBLICATIONS

U.S. Office Action mailed Nov. 18, 2019 for U.S. Appl. No. 16/510,775, filed Jul. 12, 2019. (9 pages).
(Continued)

*Primary Examiner* — Sang K Kim
*Assistant Examiner* — Nathaniel L Adams
(74) *Attorney, Agent, or Firm* — Perkins Coie LLP

(57) ABSTRACT

Disclosed are a winch, a rope guide, and a transmission device having a clutch function. The winch includes a base seat, a reel, a rope guide, a transmission assembly, and a motor. The reel is rotatably provided to the base seat. The rope guide is provided to the base seat. The transmission assembly is connected with the rope guide. The motor is connected with the reel to drive the reel to rotate, and the motor drives the rope guide through the transmission assembly. In the winch according to embodiments of the present disclosure, the rope guide is an active rope guide, bringing about a good rope guiding effect. Moreover, the reel and the rope guide are driven by the same motor, which reduces the number of components and parts, simplifies the structure and control, and lowers costs.

6 Claims, 17 Drawing Sheets

(30) Foreign Application Priority Data

Feb. 28, 2019 (CN) ......................... 201910149808.9
Feb. 28, 2019 (CN) ......................... 201910149845.X
Feb. 28, 2019 (CN) ......................... 201920257640.9
Feb. 28, 2019 (CN) ......................... 201920257882.8
Feb. 28, 2019 (CN) ......................... 201920258158.7
Feb. 28, 2019 (CN) ......................... 201920258609.7

(56) References Cited

U.S. PATENT DOCUMENTS 724,155 A 3/1903 Besse
752,031 A 2/1904 Chadwick
817,224 A 4/1906 Clifford
955,658 A 4/1910 Mitchell et al.
1,063,643 A 6/1913 Blake et al.
1,169,140 A 1/1916 Fassett et al.
1,176,538 A 3/1916 Warner
1,182,169 A 5/1916 Hansen
1,222,127 A 4/1917 Perri
1,239,892 A 9/1917 Dunderdale
1,242,828 A 10/1917 Lyle
1,250,604 A 12/1917 Lorenc
1,268,335 A 6/1918 Fairchild
1,364,697 A 1/1921 Branch
1,437,648 A 12/1922 Gore
1,449,031 A 3/1923 Blake
1,471,972 A 10/1923 Miller
1,621,479 A 3/1927 Cleveland et al.
1,945,702 A 2/1930 Pitter
1,755,942 A 4/1930 Woolson
1,800,162 A 4/1931 Stroud
2,029,745 A 2/1936 Stiner
2,041,640 A 5/1936 Goss
2,090,445 A * 8/1937 Hale ...................... B65H 75/42
242/391.2
2,118,557 A 5/1938 Hamilton
2,122,040 A 6/1938 Machovec
2,125,085 A 7/1938 Pool
2,197,266 A 4/1940 Fredell
2,209,576 A 7/1940 McDonald
2,246,986 A 6/1941 Pellegrini
2,436,961 A 3/1948 Gabriel
2,487,921 A 11/1949 Culver
2,492,068 A 12/1949 Schofield et al.
2,566,401 A 9/1951 Bustin
2,575,615 A 11/1951 Crump
2,583,894 A 1/1952 Shuck
2,645,504 A 7/1953 Branstrator et al.
2,669,613 A 2/1954 Despard
2,678,832 A 5/1954 Wright
2,682,671 A 7/1954 Faure
2,764,422 A 9/1956 McDonald
2,774,494 A 12/1956 Malmström
2,825,582 A 3/1958 McDonald
2,921,643 A 1/1960 Vanderveld
2,925,876 A 2/1960 Wagner
2,998,265 A 8/1961 Kozicki
3,008,533 A 11/1961 Haberle
3,012,633 A 12/1961 Magee
3,039,562 A 6/1962 Wagner
3,095,216 A 6/1963 Browne et al.
3,164,394 A 1/1965 Husko
3,172,499 A 3/1965 Stairs
3,266,594 A 8/1966 Antosh et al.
3,329,443 A 7/1967 Lowder et al.
3,392,990 A 7/1968 Wolf
3,488,066 A 1/1970 Hansen
3,494,634 A 2/1970 De Paula
3,515,406 A 6/1970 Endsley
3,517,942 A 6/1970 Cuffe et al.
3,522,396 A 7/1970 Norden
3,528,574 A 9/1970 Denner et al.
3,572,754 A 3/1971 Fowler
3,608,957 A 9/1971 Maneck
3,650,423 A 3/1972 O'Brien
3,671,058 A 6/1972 Kent
3,745,595 A 7/1973 Nagy
3,756,622 A 9/1973 Pyle et al.
3,762,742 A 10/1973 Bucklen
3,784,227 A 1/1974 Rogge
3,799,288 A 3/1974 Manuel
3,807,757 A 4/1974 Carpenter et al.
3,833,240 A 9/1974 Weiler
3,853,369 A 12/1974 Holden
3,863,890 A 2/1975 Ruffing
3,865,399 A 2/1975 Way
3,869,022 A 3/1975 Wallk
3,869,169 A 3/1975 Johnson et al.
3,887,217 A 6/1975 Thomas
3,889,997 A 6/1975 Schoneck
3,891,261 A 6/1975 Finneman
3,913,497 A 10/1975 Maroshick
3,915,475 A 10/1975 Casella et al.
3,957,284 A 5/1976 Wright
3,961,809 A 6/1976 Clugston
3,980,319 A 9/1976 Kirkpatrick
3,981,515 A 9/1976 Rosborough
3,986,724 A 10/1976 Rivinius
3,997,211 A 12/1976 Graves
4,020,920 A 5/1977 Abbott
4,053,172 A 10/1977 McClure
4,058,228 A 11/1977 Hall
4,068,542 A 1/1978 Brand et al.
4,073,502 A 2/1978 Frank et al.
4,089,538 A 5/1978 Eastridge
4,098,346 A 7/1978 Stanfill
4,103,872 A 8/1978 Hirasuka
4,106,790 A 8/1978 Weiler
4,110,673 A 8/1978 Nagy et al.
4,116,457 A 9/1978 Nerem et al.
4,124,099 A 11/1978 Dudynskyj
4,145,066 A 3/1979 Shearin
4,164,292 A 8/1979 Karkau
4,168,764 A 9/1979 Walters
4,174,021 A 11/1979 Barlock
4,180,143 A 12/1979 Clugston
4,185,849 A 1/1980 Jaeger
4,188,889 A 2/1980 Favrel
4,194,754 A 3/1980 Hightower
4,205,862 A 6/1980 Tarvin
4,219,104 A 8/1980 MacLeod
4,231,583 A 11/1980 Learn
4,275,664 A 6/1981 Reddy
4,325,668 A 4/1982 Julian et al.
4,369,984 A 1/1983 Hagen
4,424,751 A 1/1984 Blochlinger
4,440,364 A 4/1984 Cone et al.
4,462,486 A 7/1984 Dignan
4,536,004 A 8/1985 Brynielsson et al.
4,542,805 A 9/1985 Hamlin et al.
4,570,962 A 2/1986 Chavira
4,623,160 A 11/1986 Trudell
D287,001 S 12/1986 Jarvie et al.
4,676,013 A 6/1987 Endo
4,679,810 A 7/1987 Kimball
4,696,349 A 9/1987 Harwood et al.
D292,904 S 11/1987 Bielby
4,708,355 A 11/1987 Tiede
4,711,613 A 12/1987 Fretwell
4,720,116 A 1/1988 Williams et al.
4,733,752 A 3/1988 Sklar
4,757,876 A 7/1988 Peacock
4,846,487 A 7/1989 Criley
4,858,888 A 8/1989 Cruz et al.
4,909,700 A 3/1990 Fontecchio et al.
4,911,264 A 3/1990 McCafferty
4,926,965 A 5/1990 Fox
4,930,973 A 6/1990 Robinson
4,958,979 A 9/1990 Svensson
4,982,974 A 1/1991 Guidry
4,991,890 A 2/1991 Paulson
D316,394 S 4/1991 Carr
5,005,667 A 4/1991 Anderson
5,005,850 A 4/1991 Baughman

(56) References Cited

U.S. PATENT DOCUMENTS

| | | | | |
|---|---|---|---|---|
| 5,007,654 | A | 4/1991 | Sauber | |
| 5,028,063 | A | 7/1991 | Andrews | |
| 5,039,119 | A | 8/1991 | Baughman | |
| 5,085,450 | A | 2/1992 | DeHart, Sr. | |
| 5,137,294 | A | 8/1992 | Martin | |
| 5,154,125 | A | 10/1992 | Renner et al. | |
| 5,195,609 | A | 3/1993 | Ham et al. | |
| 5,199,731 | A | 4/1993 | Martin | |
| 5,228,707 | A | 7/1993 | Yoder | |
| 5,228,761 | A | 7/1993 | Huebschen et al. | |
| 5,238,300 | A | 8/1993 | Slivon et al. | |
| 5,253,973 | A | 10/1993 | Fretwell | |
| D340,905 | S | 11/1993 | Orth et al. | |
| 5,257,767 | A | 11/1993 | McConnell | |
| 5,257,847 | A | 11/1993 | Yonehara | |
| 5,261,779 | A | 11/1993 | Goodrich | |
| 5,280,934 | A | 1/1994 | Monte | |
| 5,284,349 | A | 2/1994 | Bruns et al. | |
| 5,286,049 | A | 2/1994 | Khan | |
| 5,342,073 | A | 8/1994 | Poole | |
| 5,358,268 | A | 10/1994 | Hawkins | |
| 5,375,864 | A | 12/1994 | McDaniel | |
| 5,423,463 | A | 6/1995 | Weeks | |
| 5,425,615 | A | 6/1995 | Hall et al. | |
| 5,439,342 | A | 8/1995 | Hall et al. | |
| 5,462,302 | A | 10/1995 | Leitner | |
| 5,478,124 | A | 12/1995 | Warrington | |
| 5,498,012 | A | 3/1996 | McDaniel et al. | |
| 5,501,475 | A | 3/1996 | Bundy | |
| 5,505,476 | A | 4/1996 | Maccabee | |
| 5,513,866 | A | 5/1996 | Sisson | |
| 5,538,100 | A | 7/1996 | Hedley | |
| 5,538,265 | A | 7/1996 | Chen et al. | |
| 5,538,269 | A | 7/1996 | McDaniel et al. | |
| 5,547,040 | A | 8/1996 | Hanser et al. | |
| 5,549,312 | A | 8/1996 | Garvert | |
| 5,584,493 | A | 12/1996 | Demski et al. | |
| 5,601,300 | A | 2/1997 | Fink et al. | |
| 5,624,127 | A | 4/1997 | Arreola et al. | |
| 5,663,541 | A * | 9/1997 | McGregor, II | B66D 1/36<br>200/17 R |
| 5,697,623 | A | 12/1997 | Bermes et al. | |
| 5,697,626 | A | 12/1997 | McDaniel | |
| 5,727,840 | A | 3/1998 | Ochiai et al. | |
| 5,779,208 | A | 7/1998 | McGraw | |
| 5,842,709 | A | 12/1998 | Maccabee | |
| 5,876,051 | A | 3/1999 | Sage | |
| 5,897,125 | A | 4/1999 | Bundy | |
| 5,937,468 | A | 8/1999 | Wiedeck et al. | |
| 5,941,342 | A | 8/1999 | Lee | |
| 5,957,237 | A | 9/1999 | Tigner | |
| 5,980,449 | A | 11/1999 | Benson et al. | |
| 5,988,970 | A | 11/1999 | Holtom | |
| 6,012,545 | A | 1/2000 | Faleide | |
| 6,027,090 | A | 2/2000 | Liu | |
| 6,042,052 | A | 3/2000 | Smith et al. | |
| 6,050,290 | A | 4/2000 | Zhan | |
| 6,055,780 | A | 5/2000 | Yamazaki | |
| 6,065,924 | A | 5/2000 | Budd | |
| 6,082,693 | A | 7/2000 | Benson et al. | |
| 6,082,751 | A | 7/2000 | Hanes et al. | |
| 6,112,152 | A | 8/2000 | Tuttle | |
| 6,135,472 | A | 10/2000 | Wilson et al. | |
| 6,149,172 | A | 11/2000 | Pascoe et al. | |
| 6,158,756 | A | 12/2000 | Hansen | |
| 6,168,176 | B1 | 1/2001 | Mueller | |
| 6,170,842 | B1 | 1/2001 | Mueller | |
| 6,179,312 | B1 | 1/2001 | Paschke et al. | |
| 6,179,546 | B1 | 1/2001 | Citrowske | |
| 6,203,040 | B1 | 3/2001 | Hutchins | |
| 6,213,486 | B1 | 4/2001 | Kunz et al. | |
| 6,224,317 | B1 | 5/2001 | Kann | |
| 6,264,222 | B1 | 7/2001 | Johnston et al. | |
| 6,270,099 | B1 | 8/2001 | Farkash | |
| 6,325,397 | B1 | 12/2001 | Pascoe | |
| 6,352,295 | B1 | 3/2002 | Leitner | |
| 6,357,992 | B1 | 3/2002 | Ringdahl et al. | |
| 6,375,207 | B1 | 4/2002 | Dean et al. | |
| 6,412,799 | B1 | 7/2002 | Schrempf | |
| 6,422,342 | B1 | 7/2002 | Armstrong et al. | |
| 6,425,572 | B1 | 7/2002 | Lehr | |
| 6,430,164 | B1 | 8/2002 | Jones et al. | |
| 6,435,534 | B1 | 8/2002 | Stone | |
| 6,439,342 | B1 | 8/2002 | Boykin | |
| 6,460,915 | B1 | 10/2002 | Bedi et al. | |
| 6,471,002 | B1 | 10/2002 | Weinermen | |
| 6,511,086 | B2 | 1/2003 | Schlicht | |
| 6,511,402 | B2 | 1/2003 | Shu | |
| 6,513,821 | B1 | 2/2003 | Heil | |
| 6,533,303 | B1 | 3/2003 | Watson | |
| 6,536,790 | B1 | 3/2003 | Ojanen | |
| 6,588,783 | B2 | 7/2003 | Fichter | |
| 6,612,596 | B2 | 9/2003 | Jeon et al. | |
| 6,641,158 | B2 | 11/2003 | Leitner | |
| 6,659,484 | B2 | 12/2003 | Knodle et al. | |
| 6,663,125 | B1 | 12/2003 | Cheng | |
| 6,746,033 | B1 | 6/2004 | McDaniel | |
| 6,769,704 | B2 | 8/2004 | Cipolla | |
| 6,810,995 | B2 | 11/2004 | Warford | |
| 6,812,466 | B2 | 11/2004 | O'Connor et al. | |
| 6,830,257 | B2 | 12/2004 | Leitner | |
| 6,834,875 | B2 | 12/2004 | Leitner | |
| 6,840,526 | B2 | 1/2005 | Anderson et al. | |
| 6,874,801 | B2 | 4/2005 | Fichter | |
| 6,880,843 | B1 | 4/2005 | Greer, Jr. | |
| 6,912,912 | B2 | 7/2005 | Reichinger et al. | |
| 6,918,624 | B2 | 7/2005 | Miller et al. | |
| 6,926,295 | B2 | 8/2005 | Berkebile et al. | |
| 6,938,909 | B2 | 9/2005 | Leitner | |
| 6,942,233 | B2 | 9/2005 | Leitner et al. | |
| 6,942,272 | B2 | 9/2005 | Livingston | |
| 6,948,903 | B2 | 9/2005 | Ablabutyan et al. | |
| 6,951,357 | B2 | 10/2005 | Armstrong et al. | |
| 6,955,370 | B2 | 10/2005 | Fabiano et al. | |
| 6,959,937 | B2 | 11/2005 | Schneider et al. | |
| 6,966,597 | B2 | 11/2005 | Tegtmeier | |
| 6,971,652 | B2 | 12/2005 | Bobbert et al. | |
| 6,997,469 | B2 | 2/2006 | Lanoue et al. | |
| 7,000,932 | B2 | 2/2006 | Heil et al. | |
| 7,007,961 | B2 | 3/2006 | Leitner | |
| 7,017,927 | B2 | 3/2006 | Henderson et al. | |
| 7,055,839 | B2 | 6/2006 | Leitner | |
| 7,090,276 | B1 | 8/2006 | Bruford et al. | |
| 7,111,859 | B2 | 9/2006 | Kim et al. | |
| 7,118,120 | B2 | 10/2006 | Lee et al. | |
| 7,163,221 | B2 | 1/2007 | Leitner | |
| 7,258,386 | B2 | 8/2007 | Leitner | |
| 7,287,771 | B2 | 10/2007 | Lee et al. | |
| 7,360,779 | B2 | 4/2008 | Crandall | |
| 7,367,574 | B2 | 5/2008 | Leitner | |
| 7,380,807 | B2 | 6/2008 | Leitner | |
| 7,398,985 | B2 | 7/2008 | Leitner et al. | |
| 7,413,204 | B2 | 8/2008 | Leitner | |
| 7,416,202 | B2 | 8/2008 | Fichter | |
| 7,487,986 | B2 | 2/2009 | Leither et al. | |
| 7,516,703 | B2 | 4/2009 | Tazreiter | |
| 7,566,064 | B2 | 7/2009 | Leitner et al. | |
| 7,584,975 | B2 | 9/2009 | Leitner | |
| 7,617,840 | B1 | 11/2009 | Zinda | |
| 7,637,519 | B2 | 12/2009 | Leitner et al. | |
| 7,673,892 | B2 | 3/2010 | Kuntze et al. | |
| 7,717,444 | B2 | 5/2010 | Fichter | |
| 7,793,596 | B2 | 9/2010 | Hirtenlehner | |
| 7,823,896 | B2 | 11/2010 | VanBelle | |
| 7,874,565 | B2 | 1/2011 | Duncan | |
| D634,687 | S | 3/2011 | Vukel | |
| 7,900,944 | B2 | 3/2011 | Watson | |
| 7,909,344 | B1 | 3/2011 | Bundy | |
| 7,934,737 | B2 | 5/2011 | Okada | |
| 7,976,042 | B2 | 7/2011 | Watson et al. | |
| 8,038,164 | B2 | 10/2011 | Stahl et al. | |
| 8,042,821 | B2 | 10/2011 | Yang | |
| D649,100 | S | 11/2011 | Cheng | |
| 8,052,162 | B2 | 11/2011 | Yang et al. | |

(56) References Cited

U.S. PATENT DOCUMENTS 8,056,913 B2 11/2011 Kuntze et al.
8,070,173 B2 12/2011 Watson
8,136,826 B2 3/2012 Watson
8,146,935 B1 4/2012 Adams
8,157,277 B2 4/2012 Leitner et al.
8,177,247 B1 5/2012 Carr
8,205,901 B2 6/2012 Yang et al.
D665,713 S 8/2012 Pochurek et al.
8,262,113 B1 9/2012 Chafey et al.
8,267,379 B2 * 9/2012 Yang ........................ B66D 1/36 254/323
8,297,635 B2 10/2012 Agoncillo et al.
D671,874 S 12/2012 Kekich et al.
8,342,550 B2 1/2013 Stickles et al.
8,342,551 B2 1/2013 Watson et al.
8,360,455 B2 1/2013 Leitner et al.
8,408,571 B2 4/2013 Leitner et al.
8,419,034 B2 4/2013 Leitner et al.
8,469,305 B2 6/2013 Feldstein et al.
8,469,380 B2 6/2013 Yang et al.
8,602,431 B1 12/2013 May
8,827,294 B1 9/2014 Leitner et al.
8,833,782 B2 9/2014 Huotari et al.
8,844,957 B2 9/2014 Leitner et al.
D720,674 S 1/2015 Stanesic et al.
8,936,266 B2 1/2015 Leitner et al.
8,944,451 B2 2/2015 Leitner et al.
8,973,902 B2 3/2015 Huang
9,156,406 B2 10/2015 Stanesic et al.
9,272,667 B2 3/2016 Smith
9,302,626 B2 4/2016 Leitner et al.
9,346,404 B1 5/2016 Bundy
9,346,405 B2 5/2016 Leitner et al.
9,511,717 B2 12/2016 Smith
9,522,634 B1 12/2016 Smith
9,527,449 B2 12/2016 Smith
9,550,458 B2 1/2017 Smith et al.
9,561,751 B2 2/2017 Leitner et al.
9,573,467 B2 2/2017 Chen et al.
9,656,609 B2 5/2017 Du et al.
9,669,766 B2 6/2017 Du et al.
9,669,767 B2 6/2017 Du et al.
9,688,205 B2 6/2017 Du et al.
9,701,249 B2 7/2017 Leitner et al.
9,764,691 B2 9/2017 Stickles et al.
9,809,172 B2 11/2017 Stanesic et al.
9,834,147 B2 12/2017 Smith
9,902,328 B1 2/2018 Mazur
9,944,231 B2 4/2018 Leitner et al.
10,053,017 B2 8/2018 Leitner et al.
10,065,486 B2 9/2018 Smith et al.
10,077,016 B2 9/2018 Smith et al.
10,081,302 B1 9/2018 Frederick et al.
10,093,522 B1 10/2018 Baugh
10,106,069 B2 10/2018 Rasekhi
10,106,086 B1 10/2018 Eckstein et al.
10,106,087 B2 10/2018 Stojkovic et al.
10,106,088 B2 10/2018 Smith
10,118,557 B2 11/2018 Pribisic
10,124,839 B2 11/2018 Povinelli et al.
10,144,345 B2 12/2018 Stinson et al.
10,150,419 B2 12/2018 Derbis et al.
10,155,474 B2 12/2018 Salter et al.
10,173,595 B1 1/2019 Ulrich
10,183,623 B2 1/2019 Kirshnan et al.
10,183,624 B2 1/2019 Leitner et al.
10,189,517 B2 1/2019 Povinelli et al.
10,195,997 B2 2/2019 Smith
10,207,598 B2 2/2019 Reynolds et al.
10,214,963 B2 2/2019 Simula et al.
10,384,614 B1 8/2019 Du et al.
11,155,450 B2 10/2021 Fan et al.
11,713,223 B2 * 8/2023 Zhan ........................ B66D 1/38 254/335
2003/0011164 A1 1/2003 Cipolla
2003/0038446 A1 2/2003 Anderson et al.
2003/0090081 A1 5/2003 Oakley
2003/0094781 A1 5/2003 Jaramillo et al.
2003/0132595 A1 7/2003 Fabiano
2003/0200700 A1 10/2003 Leitner
2004/0100063 A1 5/2004 Henderson et al.
2004/0108678 A1 6/2004 Berkebile et al.
2004/0135339 A1 7/2004 Kim
2005/0035568 A1 2/2005 Lee et al.
2005/0146157 A1 7/2005 Leitner
2005/0280242 A1 12/2005 Fabiano et al.
2006/0054731 A1 3/2006 Nagler
2006/0214386 A1 9/2006 Watson
2006/0219484 A1 10/2006 Ogura
2006/0284440 A1 12/2006 Leitner
2008/0042396 A1 2/2008 Watson
2008/0100023 A1 5/2008 Ross
2009/0250896 A1 10/2009 Watson
2009/0295114 A1 12/2009 Yang et al.
2010/0044993 A1 2/2010 Watson
2011/0065546 A1 3/2011 Xie et al.
2011/0115187 A1 5/2011 Leitner et al.
2012/0025485 A1 2/2012 Yang et al.
2013/0154230 A1 6/2013 Ziaylek
2015/0097353 A1 4/2015 Rasmussen et al.
2015/0197199 A1 7/2015 Kuo
2015/0321612 A1 11/2015 Leitner et al.
2015/0321613 A1 11/2015 Leitner et al.
2016/0016766 A1 1/2016 Ho
2016/0039346 A1 2/2016 Yang et al.
2016/0158584 A1 6/2016 Burke et al.
2016/0193964 A1 7/2016 Stanesic et al.
2017/0008459 A1 1/2017 Leitner et al.
2017/0036607 A1 2/2017 Du et al.
2017/0144606 A1 5/2017 Smith
2017/0190308 A1 6/2017 Smith
2017/0246993 A1 8/2017 Smith
2017/0267182 A1 9/2017 Leitner
2017/0355315 A1 12/2017 Leitner
2018/0118530 A1 5/2018 August
2018/0141497 A1 5/2018 Smith
2018/0148306 A1 5/2018 Zheng
2018/0201194 A1 7/2018 Stanesic
2018/0215591 A1 * 8/2018 Anderson ................ B66D 1/38
2018/0257572 A1 9/2018 Du et al.
2018/0281687 A1 10/2018 Derbis et al.
2018/0326911 A1 11/2018 Leitner
2019/0009725 A1 1/2019 Stojkovic et al.
2019/0047477 A1 2/2019 Crandall
2019/0054961 A1 2/2019 Ngo
2019/0071021 A1 3/2019 Pribisic
2019/0071042 A1 3/2019 Smith
2019/0084482 A1 3/2019 Long et al.
2019/0084628 A1 3/2019 Povinelli et al.
2019/0292026 A1 9/2019 Felps
2019/0300344 A1 10/2019 Cui
2020/0277169 A1 9/2020 Zhan
2020/0299116 A1 9/2020 Fan
2022/0009756 A1 1/2022 Fan et al.

FOREIGN PATENT DOCUMENTS

CN 206188291 U 5/2017
CN 206188292 U 5/2017
CN 206606959 U 11/2017
CN 207361653 U 5/2018
CN 207537039 U 6/2018
CN 208037900 U 11/2018
CN 208532082 U 2/2019
CN 210286571 U 4/2020
DE 10300960 A1 7/2004
WO 2018110886 A1 6/2018

OTHER PUBLICATIONS

U.S. Office Action mailed Dec. 20, 2019 for U.S. Appl. No. 16/655,149, filed Oct. 16, 2019. (11 pages).

(56) References Cited

OTHER PUBLICATIONS

International Search Report of the International Searching Authority for PCT International Application No. PCT/CN2019/077842 mailed Oct. 12, 2019. (English Translation, p. 1-20).
U.S. Appl. No. 16/742,632 Notice of Allowance Mailed Jun. 29, 2021, pp. 1-7.
U.S. Appl. No. 16/737,667, Restriction Requirement Mailed Mar. 21, 2022, pp. 1-6.
U.S. Appl. No. 18/335,980 Non-Final Office Action Mailed Jan. 23, 2024, pp. 1-11.
U.S. Appl. No. 18/335,993, Non-Final Office Action Mailed Jan. 30, 2024, pp. 1-11.
U.S. Appl. No. 17/484,950, Non-Final Office Action mailed Feb. 21, 2024, pp. 1-12.
Chinese Application No. 201910149808.9 Office Action Mailed Dec. 1, 2023, with English Translation, pp. 1-18.
Chinese Application No. 201910149845.X, Office Action mailed Jan. 2, 2024, with English Translation, pp. 1-10.

* cited by examiner

WINCH, ROPE GUIDE AND TRANSMISSION DEVICE HAVING CLUTCH FUNCTION

CROSS-REFERENCE TO RELATED APPLICATIONS

This application is a divisional of and claims priority and the benefits of U.S. patent application Ser. No. 16/737,667, titled "WINCH, ROPE GUIDE AND TRANSMISSION DEVICE HAVING CLUTCH FUNCTION", filed Jan. 8, 2020 which claims priority to and benefits of Chinese Patent Application Serial No. 201910149493.8, filed with National Intellectual Property Administration of People's Republic of China (PRC) on Feb. 28, 2019, Chinese Patent Application Serial No. 201920257882.8, filed with National Intellectual Property Administration of PRC on Feb. 28, 2019, Chinese Patent Application Serial No. 201910149845.X, filed with National Intellectual Property Administration of PRC on Feb. 28, 2019, Chinese Patent Application Serial No. 201920257640.9, filed with National Intellectual Property Administration of PRC on Feb. 28, 2019, Chinese Patent Application Serial No. 201910149808.9, filed with National Intellectual Property Administration of PRC on Feb. 28, 2019, Chinese Patent Application Serial No. 201920258158.7, filed with National Intellectual Property Administration of PRC on Feb. 28, 2019, Chinese Patent Application Serial No. 201910149487.2, filed with National Intellectual Property Administration of PRC on Feb. 28, 2019, and Chinese Patent Application Serial No. 201920258609.7, filed with National Intellectual Property Administration of PRC on Feb. 28, 2019, the entire contents of which are incorporated herein by reference.

TECHNICAL FIELD

The present disclosure relates to the field of automobile technology relating to winches, and more particularly to a winch, a rope guide, and a transmission device having a clutch function.

BACKGROUND

A winch is an onboard device mounted in engineering vehicles, off-road vehicles, and SUV sports cars, and it is mainly used for automobile rescue, loading and unloading, or hoisting goods. The winch is usually provided with a rope guide to guide a rope to avoid from being tangled up. In the related art, a reel of the winch is driven by a motor, and the rope guide is passive, that is, the rope guide has no motor drive. During a process of winding the rope around the reel or releasing the rope from the reel, the rope guide moves along an axial direction of the reel by means of a force of the rope, in which case the rope guiding effect is poor, and the rope and the rope guide are easily damaged due to high friction between the rope and the rope guide.

SUMMARY

Embodiments of the present disclosure aim to solve one of the technical problems in the related art at least to some extent.

To this end, embodiments of an aspect of the present disclosure provide a winch, whose rope guide is an active rope guide, thereby having a good rope guiding effect. Moreover, a reel and the rope guide are driven by a common motor, thereby reducing components and parts, simplifying the structure and control, and lowering costs.

Embodiments of another aspect of the present disclosure provide a rope guide.

Embodiments of still another aspect of the present disclosure provide a transmission device.

The winch according to embodiments of the first aspect of the present disclosure includes: a base seat; a reel rotatably provided to the base seat; a rope guide provided to the base seat; a transmission assembly operably connected with the rope guide; and a motor operably connected with the reel to drive the reel to rotate, and configured to drive the rope guide through the transmission assembly.

In the winch according to embodiments of the present disclosure, the rope guide is an active rope guide, bringing about a good rope guiding effect. Moreover, the reel and the rope guide are driven by the same motor, that is, the rope guide does not require a separate power source, which reduces the number of components and parts of the winch, simplifies the structure and control, and lowers costs.

In some embodiments, the winch further includes a transmission device, and the transmission assembly drives the rope guide through the transmission device. The transmission device includes: a sleeve body connected with the rope guide; a transmission shaft rotatably connected to the base seat and passing through the sleeve body, and configured to be driven to rotate by the transmission assembly; and a clutch member mounted on the sleeve body and capable of being engaged with and disengaged from the transmission shaft. When the transmission shaft rotates and is engaged with the clutch member, the clutch member is driven to move the sleeve body in an axial direction of the transmission shaft.

In some embodiments, an outer circumferential surface of the transmission shaft is provided with a bidirectional spiral groove extending in the axial direction of the transmission shaft; the clutch member has a first end and a second end, and the clutch member is movable between an engaged position where the first end of the clutch member is engaged in the spiral groove and a disengaged position where the first end of the clutch member is disengaged from the spiral groove.

In some embodiments, the sleeve body defines a first hole and a second hole therein, the first hole penetrates the sleeve body, and the transmission shaft rotatably passes through the first hole. The second hole has a first end in communication with the first hole and a second end provided with a cover plate, and the first end of the clutch member extends through the cover plate into the second hole.

In some embodiments, the clutch member includes a clutch shaft, an elastic member, and an engagement plate; the elastic member is provided between the cover plate and the clutch shaft to push the clutch shaft toward the transmission shaft; the engagement plate is integrally provided at a first end face of the clutch shaft and can be engaged with or disengaged from the transmission shaft; and a surface of the engagement plate facing the transmission shaft is in a concave arc shape.

In some embodiments, the clutch shaft has a flange, and the elastic member is configured as a coil spring that is fitted over the clutch shaft and located between the cover plate and the flange. The cover plate is provided with a through groove, the clutch shaft is provided with a stop pin, and when the stop pin is aligned with the through groove, the stop pin can extend out of the cover plate through the through groove. When the transmission shaft is engaged with the clutch member, the stop pin is located in the second hole. The stop pin can abut against an upper surface of the cover plate to stop the clutch shaft from moving along an axial direction of the second hole when the transmission shaft is disengaged from the clutch member.

In some embodiments, the transmission assembly is configured as a gear transmission device, and includes a ring gear mounted to the reel and a gear set meshing with the ring gear; the gear set is connected to the transmission shaft to drive the transmission shaft to rotate.

In some embodiments, the gear set includes: a first gear meshing with the ring gear; a second gear mounted to a common shaft together with the first gear; a third gear mounted to the transmission shaft and driven by the second gear; a fourth gear meshing with the second gear; and a fifth gear mounted to a common shaft together with the fourth gear and meshing with the third gear.

In some embodiments, the rope guide includes: a sliding block defining a central cavity penetrating the sliding block in a front-rear direction, and connected with the sleeve body through a safety pin; an upper rope guiding drum rotatably provided in the central cavity; a lower rope guiding drum rotatably provided in the central cavity, and opposite to and spaced apart from the upper rope guiding drum; a rope-arranging sheave shaft; a rope-arranging sheave rotatably mounted to the rope-arranging sheave shaft and located in the central cavity; and an adjustment handle connected with the rope-arranging sheave shaft to adjust the rope-arranging sheave between a tensioned position where a rope L is tensioned and a release position where the rope L is released.

In some embodiments, in the tensioned position, the highest point of a rope-arranging face of the rope-arranging sheave is higher than the lowest point of a rope guiding face of the upper rope guiding drum; in the release position, the highest point of the rope-arranging face of the rope-arranging sheave is lower than the highest point of a rope guiding face of the lower rope guiding drum or is flush with the highest point of the rope guiding face of the lower rope guiding drum.

In some embodiments, the sliding block has a first side wall and a second side wall opposite to each other in a left-right direction, the first side wall is provided with a first elongated slot extending in an up-down direction, and the second side wall is provided with a second elongated slot extending in the up-down direction. The rope-arranging sheave shaft has a first end fitted with the first elongated slot and extending out of the first elongated slot to be connected with the adjustment handle, and has a second end fitted with the second elongated slot and extending out of the second elongated slot to be connected with the adjustment handle. The first elongated slot has an upper end provided with a first recess extending rearwards, and the second elongated slot has an upper end provided with a second recess extending rearwards. In the tensioned position, the first end of the rope-arranging sheave shaft is fitted in the first recess, and the second end of the rope-arranging sheave shaft is fitted in the second recess; in the release position, the first end of the rope-arranging sheave shaft is fitted in a lower end of the first elongated slot, and the second end of the rope-arranging sheave shaft is fitted in a lower end of the second elongated slot.

In some embodiments, the adjustment handle includes a first side plate, a second side plate, and a grip; an upper end of the first side plate and an upper end of the second side plate are both connected to the grip; the first side plate has a lower end connected with the first end of the rope-arranging sheave shaft; and the second side plate has a lower end connected with the second end of the rope-arranging sheave shaft. The first side plate is provided with a first sliding guide groove extending along a length direction of the first side plate, and the second side plate is provided with a second sliding guide groove extending along a length direction of the second side plate. An outer wall face of the first side wall of the sliding block is provided with a first guide pin shaft fitted with the first sliding guide groove, and an outer wall face of the second side wall of the sliding block is provided with a second guide pin shaft fitted with the second sliding guide groove.

In some embodiments, the rope guide further includes an upper guide shaft, a lower guide shaft, a first guide roller, and a second guide roller. The first guide roller and the second guide roller are mounted to the sliding block and located at a front opening of the central cavity, and the first guide roller and the second guide roller extend in the up-down direction and are spaced apart from each other in the left-right direction. The upper rope guiding drum is rotatably mounted to the upper guide shaft and is slidable along an axial direction of the upper guide shaft; the lower rope guiding drum is rotatably mounted to the lower guide shaft and is slidable along an axial direction of the lower guide shaft. The upper guide shaft and the lower guide shaft pass through the sliding block, and the sliding block is slidable along the upper guide shaft and the lower guide shaft.

The rope guide according to embodiments of the second aspect of the present disclosure includes: a sliding block defining a central cavity penetrating the sliding block in a first direction (e.g., front-rear direction), and having a first side wall and a second side wall opposite to each other in a second direction (e.g., left-right direction); an upper rope guiding drum rotatably provided in the central cavity; a lower rope guiding drum rotatably provided in the central cavity, and opposite to and spaced apart from the upper rope guiding drum; a rope-arranging sheave shaft; a rope-arranging sheave rotatably mounted to the rope-arranging sheave shaft and located in the central cavity; and an adjustment handle connected with the rope-arranging sheave shaft to adjust the rope-arranging sheave between a tensioned position where a rope is tensioned and a release position where the rope is released.

For the rope guide according to the embodiments of the present disclosure, by providing the rope-arranging sheave, the upper rope guiding drum, and the lower rope guiding drum, the rope can be tidily wound around and arranged onto the reel; by providing the adjustment handle, the rope-arranging sheave can be conveniently moved between the tensioned position and the release position. In such a way, the structure is simple, the cost is low, and the adjustment is reliable.

In some embodiments, a central axis of the lower rope guiding drum is aligned with a central axis of the upper rope guiding drum in a third direction (e.g., an up-down direction), and the rope-arranging sheave is arranged behind the upper rope guiding drum and the lower rope guiding drum.

In some embodiments, in the tensioned position, the highest point of a rope-arranging face of the rope-arranging sheave is higher than the lowest point of a rope guiding face of the upper rope guiding drum; in the release position, the highest point of the rope-arranging face of the rope-arranging sheave is lower than the highest point of a rope guiding face of the lower rope guiding drum or is flush with the highest point of the rope guiding face of the lower rope guiding drum.

In some embodiments, the first side wall is provided with a first elongated slot extending in a third direction (e.g., an up-down direction), and the second side wall is provided with a second elongated slot extending in the up-down direction. The rope-arranging sheave shaft has a first end fitted with the first elongated slot and extending out of the first elongated slot to be connected with the adjustment handle, and has a second end fitted with the second elongated slot and extending out of the second elongated slot to be connected with the adjustment handle.

In some embodiments, the first elongated slot has an upper end provided with a first recess extending rearwards, and the second elongated slot has an upper end provided with a second recess extending rearwards. In the tensioned position, the first end of the rope-arranging sheave shaft is fitted in the first recess, and the second end of the rope-arranging sheave shaft is fitted in the second recess; in the release position, the first end of the rope-arranging sheave shaft is fitted in a lower end of the first elongated slot, and the second end of the rope-arranging sheave shaft is fitted in a lower end of the second elongated slot.

In some embodiments, the adjustment handle includes a first side plate, a second side plate, and a grip; an upper end of the first side plate and an upper end of the second side plate are both connected to the grip; the first side plate has a lower end connected with the first end of the rope-arranging sheave shaft; and the second side plate has a lower end connected with the second end of the rope-arranging sheave shaft. The first side plate is provided with a first sliding guide groove extending along a length direction of the first side plate, and the second side plate is provided with a second sliding guide groove extending along a length direction of the second side plate. An outer wall face of the first side wall of the sliding block is provided with a first guide pin shaft fitted with the first sliding guide groove, and an outer wall face of the second side wall of the sliding block is provided with a second guide pin shaft fitted with the second sliding guide groove.

In some embodiments, the rope guide further includes a first guide roller and a second guide roller. The first guide roller and the second guide roller are mounted to the sliding block and located at a front opening of the central cavity. The first guide roller and the second guide roller extend in the up-down direction and are spaced apart from each other in the left-right direction.

In some embodiments, the rope guide further includes an upper guide shaft, a lower guide shaft, a first guide roller, and a second guide roller. The first guide roller and the second guide roller are mounted to the sliding block and located at a front opening of the central cavity; the first guide roller and the second guide roller extend in the up-down direction and are spaced apart from each other in the left-right direction. The upper rope guiding drum is rotatably mounted to the upper guide shaft and is slidable along an axial direction of the upper guide shaft; the lower rope guiding drum is rotatably mounted to the lower guide shaft and is slidable along an axial direction of the lower guide shaft; the upper guide shaft and the lower guide shaft pass through the sliding block, and the sliding block is slidable along the upper guide shaft and the lower guide shaft.

The transmission device according to embodiments of the third aspect of the present disclosure includes: a sleeve body; a transmission shaft having an outer circumferential surface provided with a spiral groove, passing through the sleeve body, and configured to be rotatable with respect to the sleeve body; and a clutch member having a first end and a second end, mounted to the sleeve body, and configured to be movable between an engaged position and a disengaged position. In the engaged position, the first end of the clutch member is engaged in the spiral groove, such that the clutch member is driven to move the sleeve body along an axial direction of the transmission shaft when the transmission shaft rotates; and, in the disengaged position, the first end of the clutch member is disengaged from the spiral groove.

For the transmission device according to the embodiments of the present disclosure, since the clutch member cooperates with the transmission shaft, it is possible to disconnect the clutch member with the transmission shaft when the free end of the rope is subjected to an excessive load, such that the transmission shaft no longer drives the rope guide to operate, thereby protecting the transmission shaft.

In some embodiments, the sleeve body has a first hole and a second hole therein; the first hole penetrates the sleeve body, and the second hole is in communication with the first hole; the transmission shaft is rotatably fitted in the first hole, and the clutch member can extend into the first hole through the second hole.

In some embodiments, a central axis of the first hole is orthogonal to a central axis of the second hole, and the central axis of the second hole passes through the center of the first hole.

In some embodiments, a central axis of the transmission shaft coincides with the central axis of the first hole.

In some embodiments, the second hole has a first portion in communication with the first hole, and the second hole has a second portion that is provided with a cover plate, and the first end of the clutch member passes through the cover plate and extends into the second hole.

In some embodiments, the clutch member includes a clutch shaft, an elastic member, and an engagement plate; the elastic member is arranged between the cover plate and the clutch shaft to push the clutch shaft toward the transmission shaft; and the engagement plate is arranged at a first end of the clutch shaft and can be engaged with or disengaged from the spiral groove.

In some embodiments, the engagement plate is integrally provided at a first end face of the clutch shaft, and a surface of the engagement plate facing the transmission shaft is in a concave arc shape.

In some embodiments, the clutch shaft has a flange, and the elastic member is configured as a coil spring that is fitted over the clutch shaft and located between the cover plate and the flange; the cover plate is provided with a through groove, the clutch shaft is provided with a stop pin, and when the stop pin is aligned with the through groove, the stop pin can extend out of the cover plate through the through groove; in the engaged position, the stop pin is located in the second hole; in the disengaged position, the stop pin abuts against an upper surface of the cover plate to stop the clutch shaft from moving along an axial direction of the second hole.

In some embodiments, the clutch shaft has a second end provided with a clutch handle, and the cover plate is threaded in the second end of the second hole.

In some embodiments, the spiral groove is configured as a bidirectional spiral groove.

DETAILED DESCRIPTION

Figure 1:
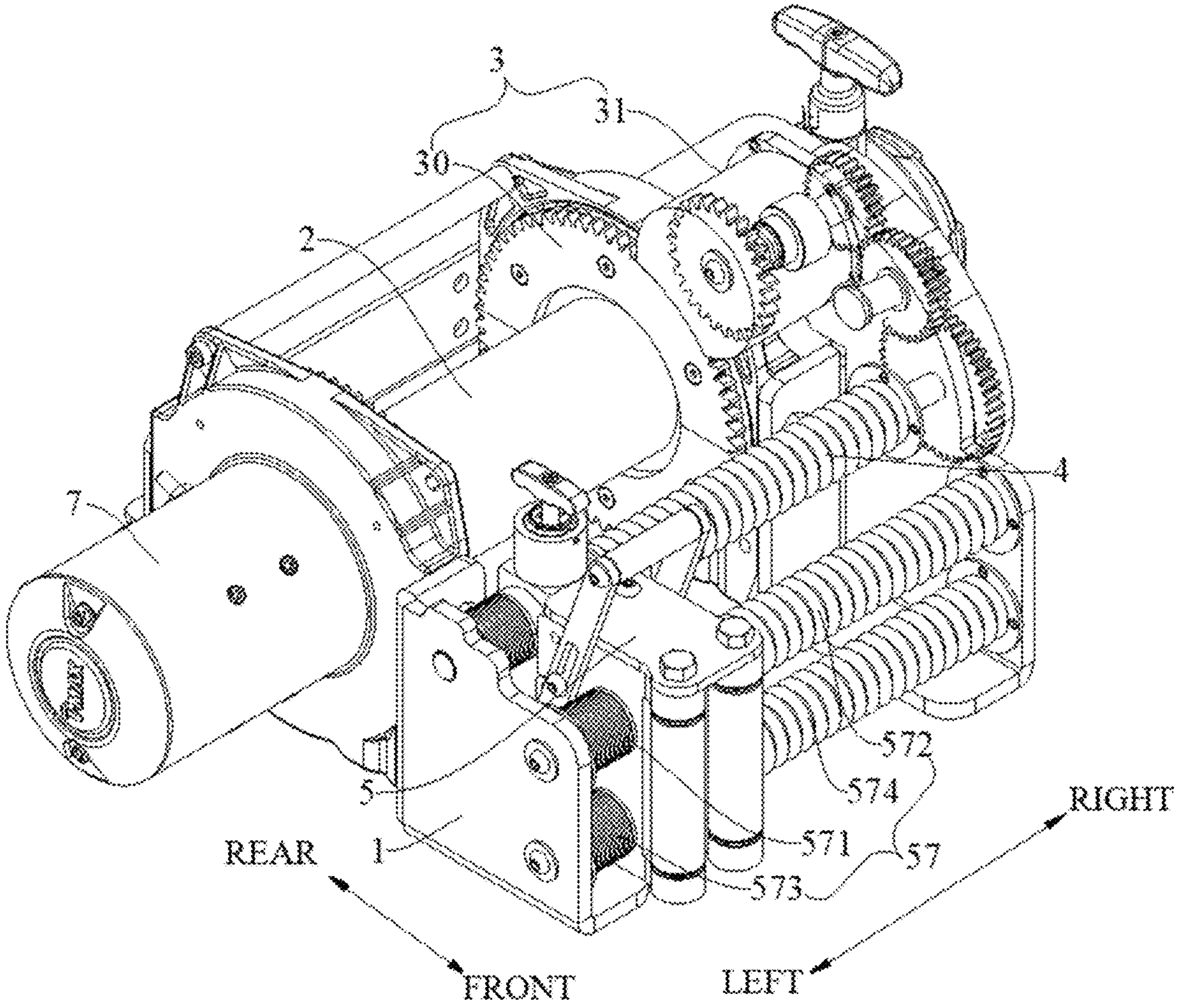
FIG. 1 is a perspective view of a winch according to an embodiment of the present disclosure.

Embodiments of the present disclosure will be described in detail hereinafter and examples of the embodiments will be illustrated in the drawings. The embodiments described below with reference to the drawings are illustrative and are used to generally understand the present disclosure. The embodiments shall not be construed to limit the present disclosure. In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation or position relationship as then described or as shown in the drawings under discussion. These relative terms are for convenience of description and do not indicate or imply that the present disclosure have a particular orientation, or be constructed and operated in a particular orientation. Thus, these terms shall not be construed to limit the present disclosure.

A winch according to embodiments of the present disclosure will be described below with reference to FIGS. 1-18.

Figure 2:
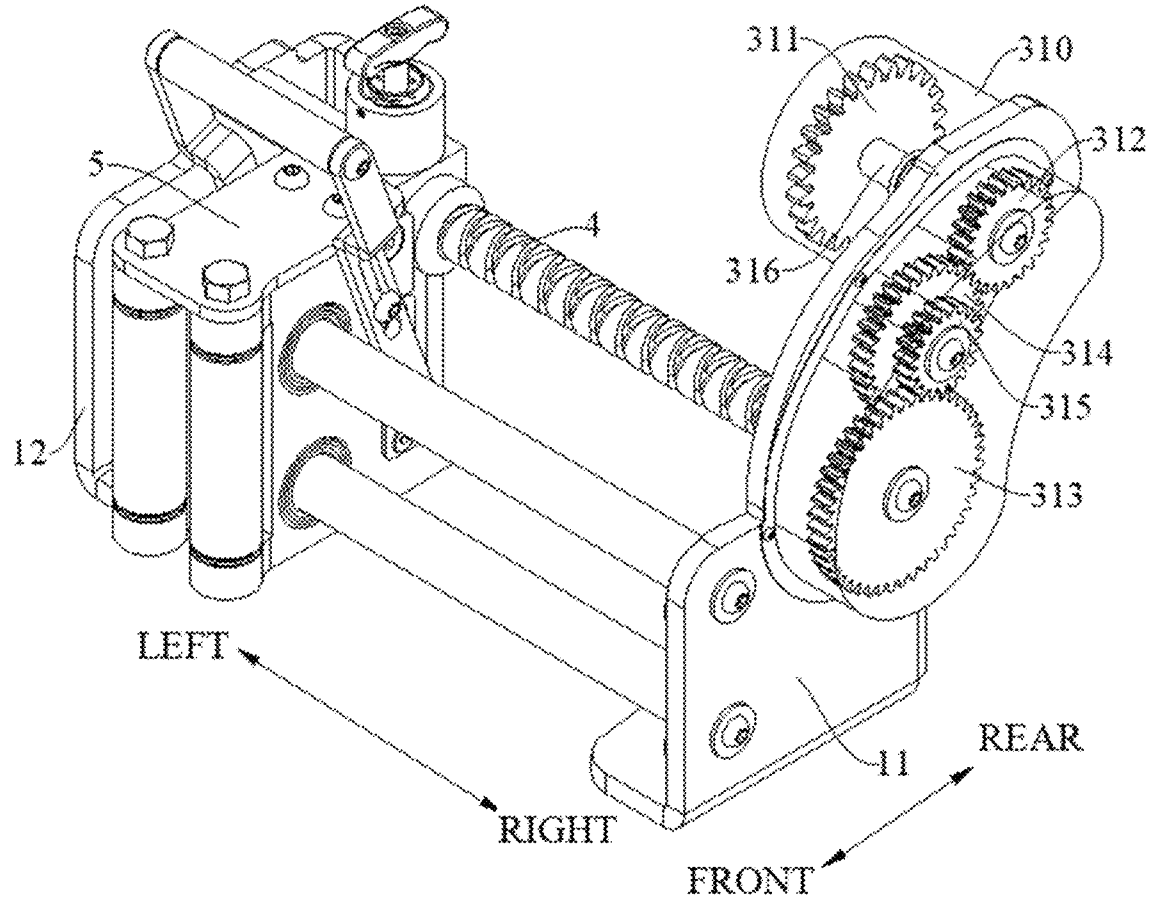
FIG. 2 is a perspective view of a winch according to an embodiment of the present disclosure, in which a motor and a reel are not illustrated.

As illustrated in FIGS. 1 and 2, the winch, according to embodiments of the present disclosure, includes a base seat 1, a reel 2, a transmission assembly 3, a rope guide 5, and a motor 7. The reel 2 is rotatably coupled to the base seat 1, and the rope guide 5 is coupled to the base seat 1. The motor 7 is connected to the reel 2 to drive the reel 2 to rotate, so as to wind a rope L around the reel 2 or release the rope L from the reel 2. The transmission assembly 3 is connected between the motor 7 and the rope guide 5, so that the motor 7 drives the rope guide 5 through the transmission assembly 3.

In the winch, according to embodiments of the present disclosure, the rope guide 5 is an active rope guide, that is, the rope guide is driven by the motor 7, thereby resulting in a good rope guiding effect. Moreover, the reel 2 and the rope guide 5 are driven by the same motor 7, that is, the rope guide 5 does not require a separate power source, which reduces the number of components and parts, simplifies the structure and control, and lowers costs.

In some embodiments, the winch also includes a transmission device 4, and the transmission assembly 3 drives the rope guide 5 by the transmission device 4. Specifically, in such embodiments, the transmission device 4 connects the transmission assembly 3 with the rope guide 5, whereby the motor 7 drives the rope guide 5 through the transmission assembly 3 and the transmission device 4 in sequence.

The transmission device 4, according to embodiments of the present disclosure, will be described in detail below with reference to the drawings.

As illustrated in FIGS. 2-7, the transmission device 4 includes a sleeve body 41, a transmission shaft 42, and a clutch member 43. The sleeve body 41 is connected to the rope guide 5, and the transmission shaft 42 is rotatably disposed to the base seat 1, passes through the sleeve body 41, and is driven to rotate by the transmission assembly 3. In other words, as illustrated in FIG. 2, the transmission shaft 42 has a right end coupled to the transmission assembly 3 to drive the transmission shaft 42 to rotate by means of the transmission assembly 3, and a left end capable of passing through the sleeve body 41.

The clutch member 43 is mounted on the sleeve body 41, and the clutch member 43 can be engaged with and disengaged from the transmission shaft 42. When the transmission shaft 42 rotates and is engaged with the clutch member 43, the transmission shaft 42 drives the clutch member 43 to move in an axial direction of the transmission shaft 42 (e.g., a left-right direction in FIG. 2), so that the clutch member 43 drives the sleeve body 41 to move along the axial direction of the transmission shaft 42. It can be understood that when the clutch member 43 is engaged with the transmission shaft 42, a driving force of the motor 7 can be transmitted to the rope guide 5 to drive the rope guide 5; after the clutch member 43 is disengaged from the transmission shaft 42, the driving force of the motor 7 cannot be transmitted to the rope guide 5.

The transmission device 4 according to embodiments of the present disclosure has a clutch function, and the clutch member 43 is engaged with the transmission shaft 42 to drive the rope guide 5 through the transmission shaft 42. Since the strength bearable by the transmission shaft 42 is limited, the transmission shaft 42 may be easily damaged if the transmission shaft 42 still drives the rope guide 5 in a case of a large load at a free end L1 of the rope L. Thus, the transmission device 4 according to embodiments of the present disclosure can disengage the clutch member 43 from the transmission shaft 42 when the load of the free end L1 of the rope L is large, so as to interrupt the power transmission between the rope guide 5 and the transmission shaft 42, thereby preventing the transmission shaft 42 from being damaged, and prolonging the service life of the transmission device 4.

Figure 6:
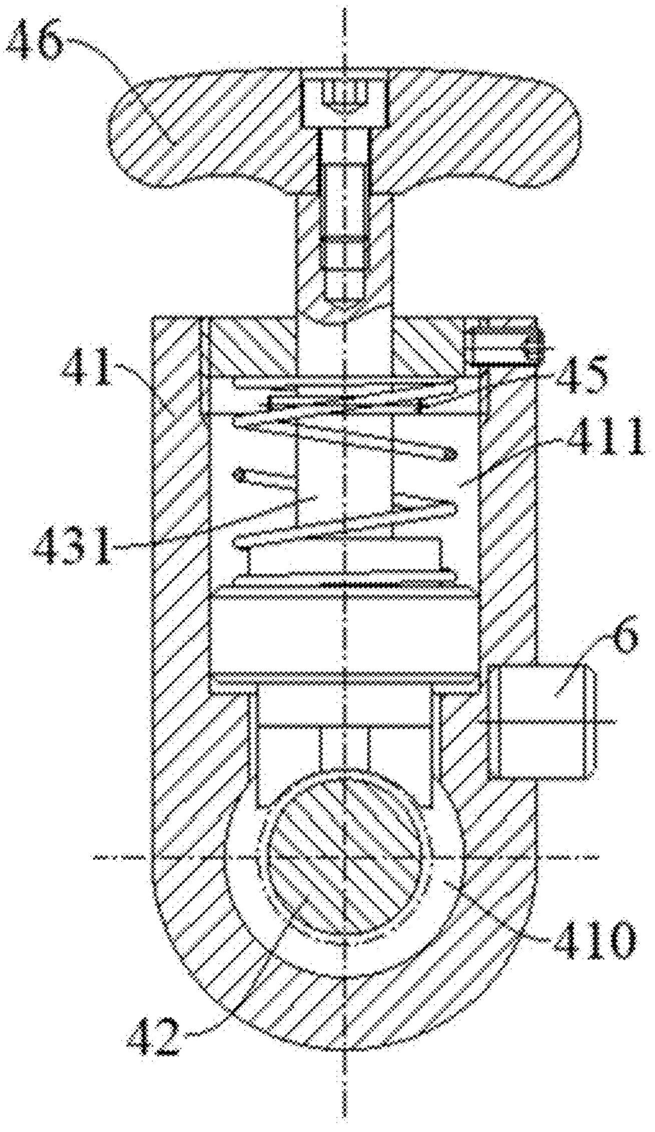
FIG. 6 is a sectional view of a transmission device according to an embodiment of the present disclosure, in which a clutch member is engaged with a transmission shaft.
Figure 7:
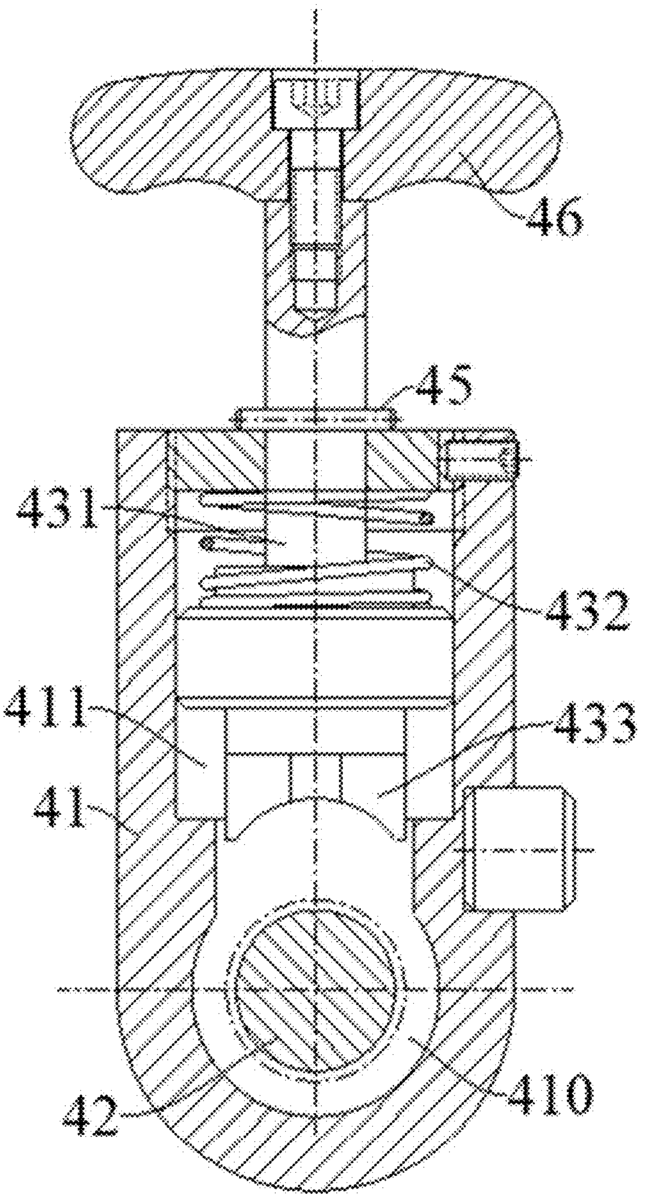
FIG. 7 is a sectional view of a transmission device according to an embodiment of the present disclosure, in which a clutch member is disengaged from a transmission shaft.

In some embodiments, an outer circumferential surface of the transmission shaft 42 is provided with a spiral groove 420 extending in the axial direction of the transmission shaft 42. The clutch member 43 has a first end and a second end, and the clutch member 43 is movable between an engaged position and a disengaged position. In the engaged position, as illustrated in FIG. 6, the first end of the clutch member 43 is engaged in the spiral groove 420; in the disengaged position, as illustrated in FIG. 7, the first end of the clutch member 43 is disengaged from the spiral groove 420. In other words, in the engaged position, a lower end of the clutch member 43 is engaged in the spiral groove 420, and in the disengaged position, the lower end of the clutch member 43 is disengaged from the spiral groove 420.

The spiral groove 420 may be a bidirectional spiral groove. When the lower end of the clutch member 43 is engaged in the spiral groove 420, the clutch member 43 reciprocates along the axial direction of the transmission shaft 42 as the transmission shaft 42 rotates. In other words, the transmission shaft 42 may be configured as a bidirectional lead screw.

In some embodiments, the sleeve body 41 has a first hole 410 and a second hole 411 therein. The first hole 410 penetrates the sleeve body 41, and the second hole 411 is in connection with the first hole 410. The transmission shaft 42 is rotatably fitted in the first hole 410, and the clutch member 43 may extend into the first hole 410 through the second hole 411.

In some embodiments, the second hole 411 has a first end in communication with the first hole 410, and a second end provided with a cover plate 44. The first end of the clutch member 43 extends through the cover plate 44 into the second hole 411. In other words, as illustrated in FIGS. 5 and 6, the first hole 410 is located at a lower end of the second hole 411, the lower end of the second hole 411 is in communication with the first hole 410, and an upper end of the second hole 411 is provided with the cover plate 44; the lower end of the clutch member 43 extends through the cover plate 44 into the second hole 411, and may extend through the second hole 411 into the first hole 410 to be engaged with the transmission shaft 42.

Specifically, the cover plate 44 is threaded into the second end of the second hole 411 to facilitate removal of the cover plate 44 from the sleeve body 41. A central axis of the first hole 410 is orthogonal to a central axis of the second hole 411, and the central axis of the second hole 411 passes through a center of the first hole 410. A s illustrated in FIG. 5, the central axis of the first hole 410 extends in a left-right direction, the central axis of the second hole 411 extends in an up-down direction, and seen from a cross section of the sleeve body 41, the central axis of the second hole 411 passes through the center of the first hole 410. Further, specifically, a central axis of the transmission shaft 42 coincides with the central axis of the first hole 410, that is, the direction in which the first hole 410 penetrates the sleeve body 41 coincides with the axial direction of the transmission shaft 42.

In some embodiments, the clutch member 43 includes a clutch shaft 431, an elastic member 432, and an engagement plate 433. The elastic member 432 is disposed between the cover plate 44 and the clutch shaft 431 to push the clutch shaft 431 toward the transmission shaft 42, and the engagement plate 433 is disposed at a first end of the clutch shaft 431 and can be engaged with or disengaged from the transmission shaft 42.

Figure 5:
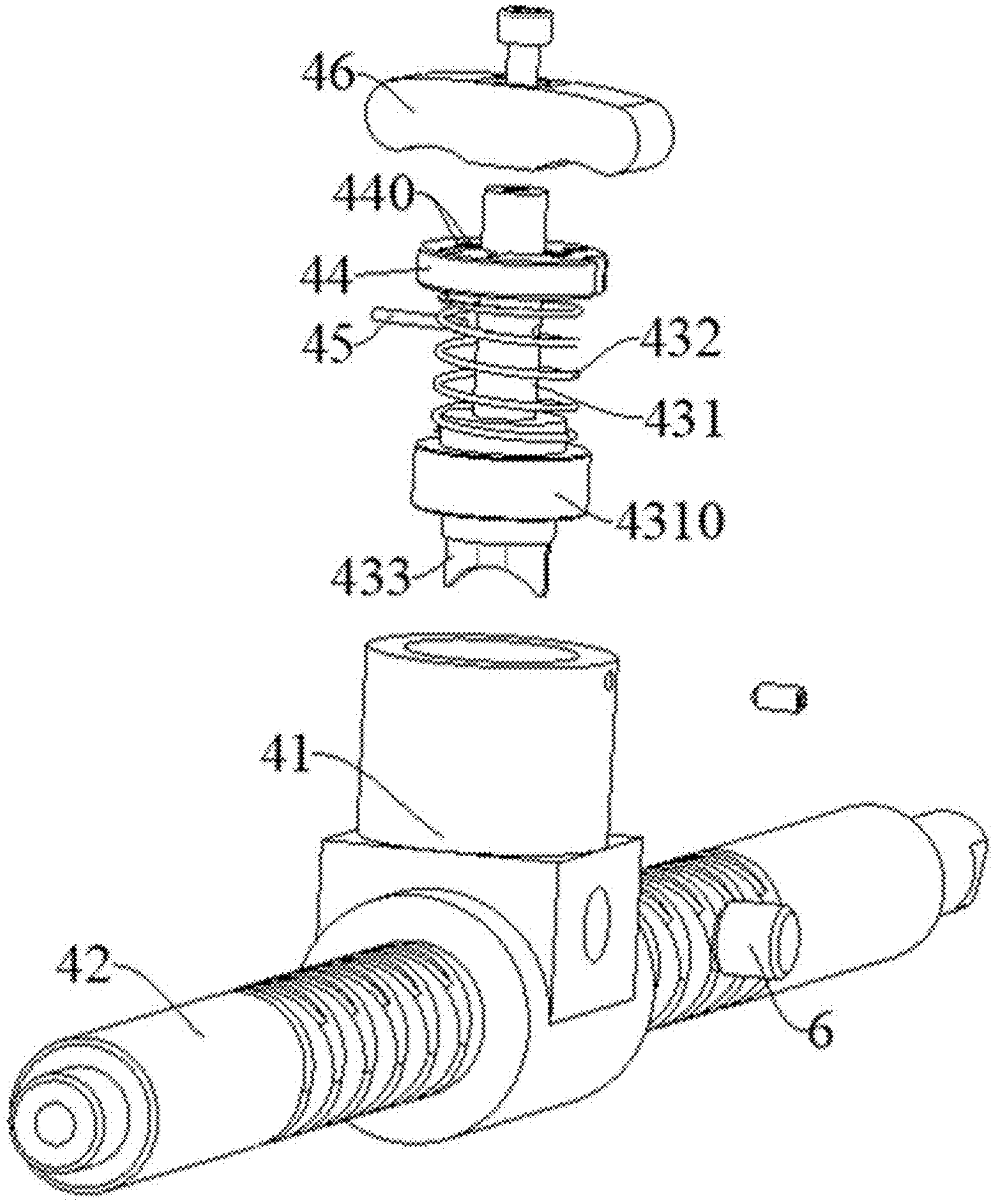
FIG. 5 is an exploded view of a transmission device according to an embodiment of the present disclosure.

As illustrated in FIGS. 5-7, the clutch shaft 431 has a flange 4310 adjacent to its lower end. The flange 4310 has a cross sectional area greater than a cross sectional area of the remaining part of the clutch shaft 431. In some embodiments, the elastic member 432 is a coil spring which is provided between a lower surface of the cover plate 44 and an upper end face of the flange 4310 and is wound around the clutch shaft 431. The engagement plate 433 is located below the flange 4310 and is connected to a lower end of the clutch shaft 431. Thus, under the action of an elastic force of the elastic member 432, the elastic member 432 pushes the upper end face of the flange 4310 to move the engagement plate 433 downwards, such that the engagement plate 433 is engaged with the spiral groove 420 of the transmission shaft 42.

In some embodiments, a surface of the engagement plate 433 facing the transmission shaft 42 is in a concave arc shape. As illustrated in FIGS. 5-7, a lower surface of the engagement plate 433 has an upwardly concave arc shape to be better engaged with the spiral groove 420 in the outer circumferential surface of the transmission shaft 42.

In a specific example, the engagement plate 433 is integrally provided to a first end face of the clutch shaft 431. In other words, as illustrated in FIG. 5, the engagement plate 433 is provided to a lower end face of the clutch shaft 431 and integrally formed with the clutch shaft 431.

In some embodiments, the cover plate 44 is provided with a through groove 440, and the clutch shaft 431 is provided with a stop pin 45. The stop pin 45 may extend out of the cover plate 44 through the through groove 440 when aligned with the through groove 440. In the engaged position where the engagement plate 433 is engaged with the spiral groove 420, the stop pin 45 is located in the second hole 411. In the disengaged position where the engagement plate 433 is disengaged from the spiral groove 420, the stop pin 45 abuts against an upper surface of the cover plate 44 to stop the clutch shaft 431 from axially moving along the second hole 411.

In other words, as illustrated in FIGS. 5-7, the cover plate 44 is provided with the through groove 440 that penetrates the thickness of the cover plate 44 in the up-down direction. In the engaged position where the engagement plate 433 is engaged with the spiral groove 420 as illustrated in FIG. 6, the stop pin 45 is located in the second hole 411. When the engagement plate 433 is disengaged from the spiral groove 420, the clutch shaft 431 moves upwards to drive the stop pin 45 to move upwards, and the stop pin 45 is aligned with the through groove 440, whereby the stop pin 45 can be driven by the clutch shaft 431 to move upwards until it protrudes from the cover plate 44. After the clutch shaft 431 protrudes through the cover plate 44, the clutch shaft 431 is rotated and hence drives the stop pin 45 to rotate, such that the stop pin 45 is offset from the through groove 440, and the stop pin 45 abuts against an upper end face of the cover plate 44, thereby preventing the clutch shaft 431 from moving downwards, so as to maintain the disengagement state of the engagement plate 433 and the spiral groove 420, as illustrated in FIG. 7.

In some embodiments, the clutch shaft 431 has a second end provided with a clutch handle 46. In other words, as illustrated in FIGS. 4-7, an upper end of the clutch shaft 431 is provided with the clutch handle 46, and the clutch handle 46 is located above the cover plate 44 and the sleeve body 41. By means of the clutch handle 46, the clutch shaft 431 can be easily rotated and can be moved up and down, to achieve engagement and disengagement of the engagement plate 433 and the transmission shaft 42.

In some embodiments, the transmission assembly 3 is a gear transmission device. The transmission assembly 3 includes a ring gear 30 mounted to the reel 2 and a gear set 31 that meshes with the ring gear 30. The gear set 31 is coupled to the transmission shaft 42 to drive the transmission shaft 42 to rotate. As illustrated in FIGS. 1-2, the reel 2 has a left end connected to a motor shaft of the motor 7 and a right end provided with the ring gear 30, and the ring gear 30 is configured as an outer ring gear. The ring gear 30 is wound around the right end of the reel 2, a right end face of the reel 2 is provided with an end plate (not illustrated), and a right end face of the ring gear 30 is connected to a left end face of the end plate, such that the ring gear 30 rotates with the reel 2 as the motor 7 drives the reel 2 to rotate.

In some embodiments, the gear set 31 includes a first gear 311, a second gear 312, and a third gear 313. The first gear 311 meshes with the ring gear 30, the second gear 312 and the first gear 311 are mounted to a common shaft, the third gear 313 is mounted to the transmission shaft 42, and the third gear 313 meshes with the second gear 312 to be driven by the second gear 312. Terms such as "first" and "second" are used herein for purposes of description and are not intended to indicate or imply relative importance or significance or to imply the number of indicated technical features. Thus, the feature defined with "first" and "second" may comprise one or more of this feature.

In other words, as illustrated in FIG. 2, the first gear 311 is coupled to a left end of a connecting shaft 316, the second gear 312 is coupled to a right end of the connecting shaft 316, and the third gear 313 meshes with the second gear 312 and is coupled to the right end of the transmission shaft 42. The second gear 312 has a diameter smaller than a diameter of the first gear 311, and the third gear 313 has a diameter larger than the diameters of the first gear 311 and the second gear 312. Thus, the ring gear 30 can sequentially drive the first gear 311, the second gear 312, the third gear 313, and the transmission shaft 42 during its rotation along with the reel 2, and in turn the transmission shaft 42 drives the sleeve body 41 to move along the axial direction of the transmission shaft 42.

In one example, the gear set 31 also includes a fourth gear 314 and a fifth gear 315. The fourth gear 314 meshes with the second gear 312, the fifth gear 315 is mounted on the same shaft as the fourth gear 314, and the fifth gear 315 meshes with the third gear 313. As illustrated in FIG. 5, the fourth gear 314 directly meshes with the second gear 312; the fifth gear 315 is provided to a right end face of the fourth gear 314 and arranged coaxially with the fourth gear 314, and the fifth gear 315 has a diameter smaller than a diameter of the fourth gear 314; the third gear 313 meshes with the fifth gear 315.

The gear set 31 is received in a casing 310. In other words, the first gear 311, the connecting shaft 316, the second gear 312, the third gear 313, the fourth gear 314, and the fifth gear 315 are covered by the casing 310 to protect the gear set 31.

The rope guide according to embodiments of the present disclosure will be described in detail below with reference to the drawings.

As illustrated in FIGS. 8-14, the rope guide 5 according to embodiments of the present disclosure includes a sliding block 50, a rope guiding drum 51, a rope-arranging sheave shaft 52, a rope-arranging sheave 53, and an adjustment handle 54. The sliding block 50 has a central cavity 500 penetrating in a front-rear direction. Front and rear surfaces of the sliding block 50 are open, so that the rope L can pass through the sliding block 50 in the front-rear direction. The sliding block 50 is coupled to the sleeve body 41, such that when the transmission shaft 42 drives the sleeve body 41 to move in the axial direction of the transmission shaft 42, the sliding block 50 moves in the axial direction of the transmission shaft 42 along with the sleeve body 41.

Figure 8:
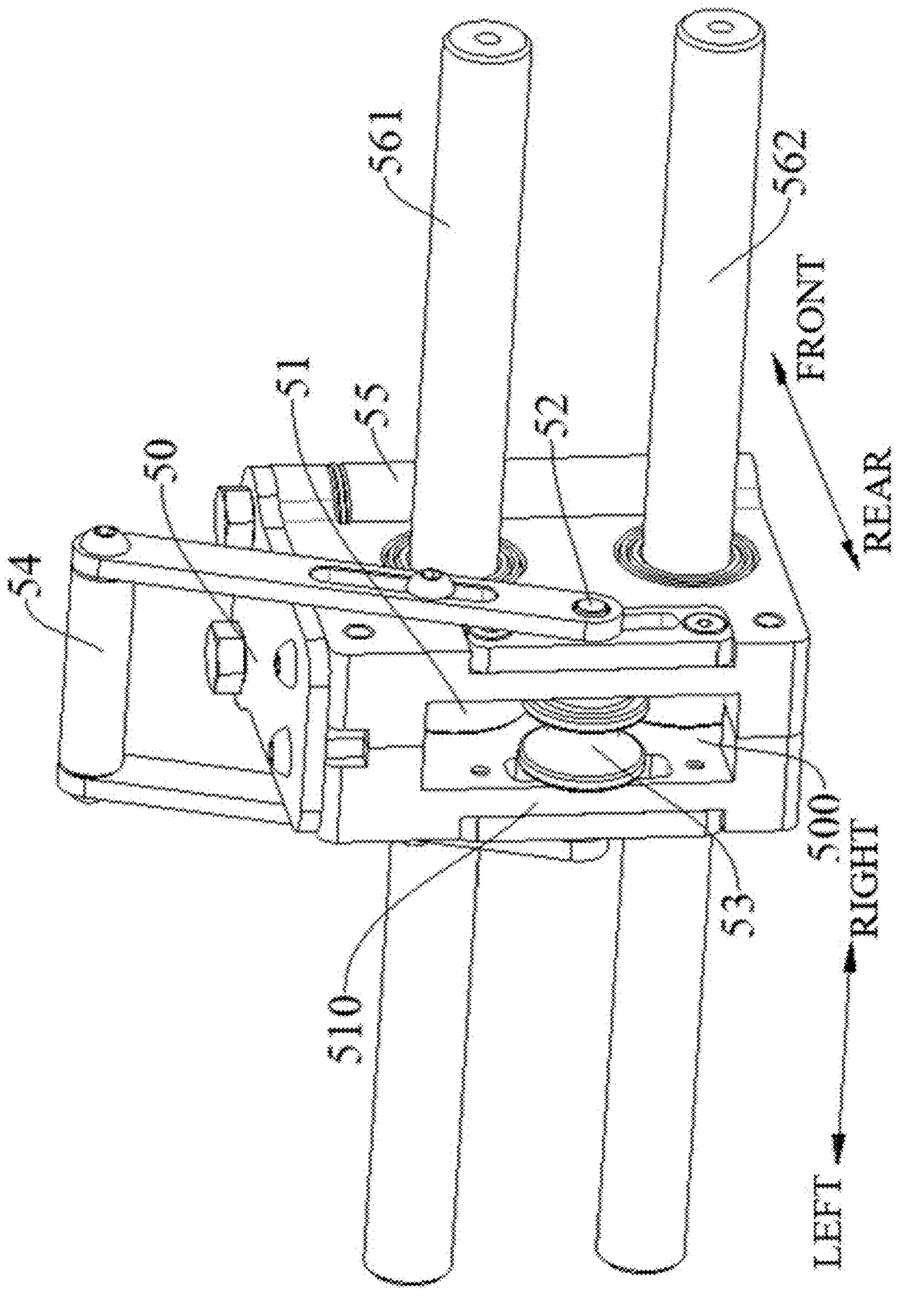
FIG. 8 is a perspective view of a rope guide according to an embodiment of the present disclosure.
Figure 9:
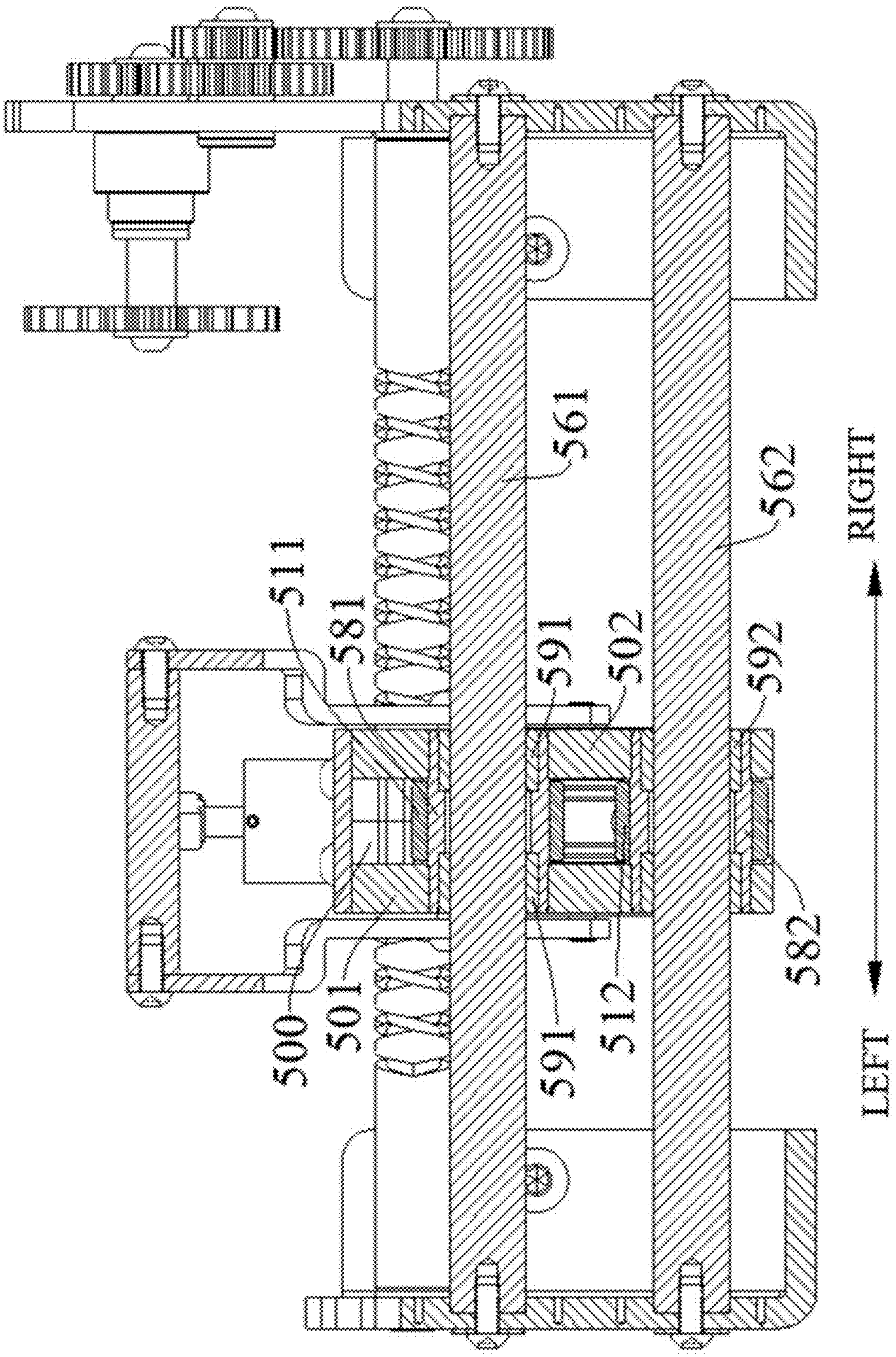
FIG. 9 is a sectional view of a rope guide according to an embodiment of the present disclosure.

The rope guiding drum 51 includes an upper rope guiding drum 511 and a lower rope guiding drum 512. The upper rope guiding drum 511 is rotatably disposed in the central cavity 500, the lower rope guiding drum 512 is rotatably disposed in the central cavity 500, and the lower rope guiding drum 512 is opposite to and spaced apart from the upper rope guiding drum 511. As illustrated in FIGS. 8 and 9, the upper rope guiding drum 511 and the lower rope guiding drum 512 are both disposed in the central cavity 500, and central axes of the two are parallel to each other; the upper rope guiding drum 511 and the lower rope guiding drum 512 are opposite to and spaced apart from each other in the up-down direction.

The rope-arranging sheave 53 is rotatably mounted to the rope-arranging sheave shaft 52 and located in the central cavity 500. Therefore, when the rope L is wound around the reel 2 (e.g., retracting the rope) or unwound from the reel 2 (e.g., releasing the rope), the rope L bypasses the highest point of a rope-arranging face of the rope-arranging sheave 53 and passes through a gap between the upper rope guiding drum 511 and the lower rope guiding drum 512, in which way the rope L is guided.

The adjustment handle 54 is coupled to the rope-arranging sheave shaft 52 to adjust the rope-arranging sheave 53 between a tensioned position where the rope L is tensioned and a release position where the rope L is released. In other words, the adjustment handle 54 is connected to the rope-arranging sheave shaft 52, and by adjusting the adjustment handle 54, the rope-arranging sheave shaft 52 can drive the rope-arranging sheave 53 to move, thereby causing the movement of the rope-arranging sheave 53 between the tensioned position where the rope L is tensioned and the release position where the rope L is released. When the rope is retracted, the rope L is subjected to certain tension to ensure that the rope L is closely arranged on the reel 2. Thus, when the rope is retracted with the free end L1 of the rope L in an unloaded state (e.g., rope retraction under no load), the rope-arranging sheave 53 is in the tensioned position to ensure that the rope L is tidily wound around the reel 2.

For the rope guide, according to the embodiments of the present disclosure, the rope-arranging sheave 53 can be conveniently adjusted by the adjustment handle 54, so as to move between the tensioned position where the rope L is tensioned and the release position where the rope L is released, so that the structure is simple, the cost is low, and the adjustment is reliable.

In one example, the central axis of the lower rope guiding drum 512 is aligned with the central axis of the upper rope guiding drum 511 in the up-down direction. In other words, as illustrated in FIG. 9, the lower rope guiding drum 512 and the upper rope guiding drum 511 have the same axial length, a left end face of the lower rope guiding drum 512 is aligned with a left end face of the upper rope guiding drum 511 in the up-down direction, and a right end face of the lower rope guiding drum 512 is aligned with a right end face of the upper rope guiding drum 511 in the up-down direction. In the up-down direction, the upper rope guiding drum 511 and the lower rope guiding drum 512 are spaced apart by a predetermined distance, thereby forming the gap between the upper rope guiding drum 511 and the lower rope guiding drum 512 to allow the passage of the rope L.

In some embodiments, the rope-arranging sheave 53 and the rope guiding drum 51 are offset from each other in the front-rear direction. Specifically, as illustrated in FIG. 8, the rope-arranging sheave 53 is located behind the upper rope guiding drum 511 and the lower rope guiding drum 512.

It could be understood that the rope-arranging sheave 53 is movable in the up-down direction, and the free end L1 of the rope L bypasses the rope-arranging sheave 53 above the rope-arranging sheave 53 and passes between the upper rope guiding drum 511 and the lower rope guiding drum 512. When the rope-arranging sheave 53 moves upwards from the release position to the tensioned position, the distance between the rope-arranging sheave 53 and the upper rope guiding drum 511 in the up-down direction is reduced, thereby tensioning the rope L.

In some embodiments, in the tensioned position, the highest point of the rope-arranging face of the rope-arranging sheave 53 is higher than the lowest point of a rope guiding face of the upper rope guiding drum 511; in the release position, the highest point of the rope-arranging face of the rope-arranging sheave 53 is lower than the highest point of a rope guiding face of the lower rope guiding drum 512 or is substantially flush with the highest point of the rope guiding face of the lower rope guiding drum 512.

Figure 13:
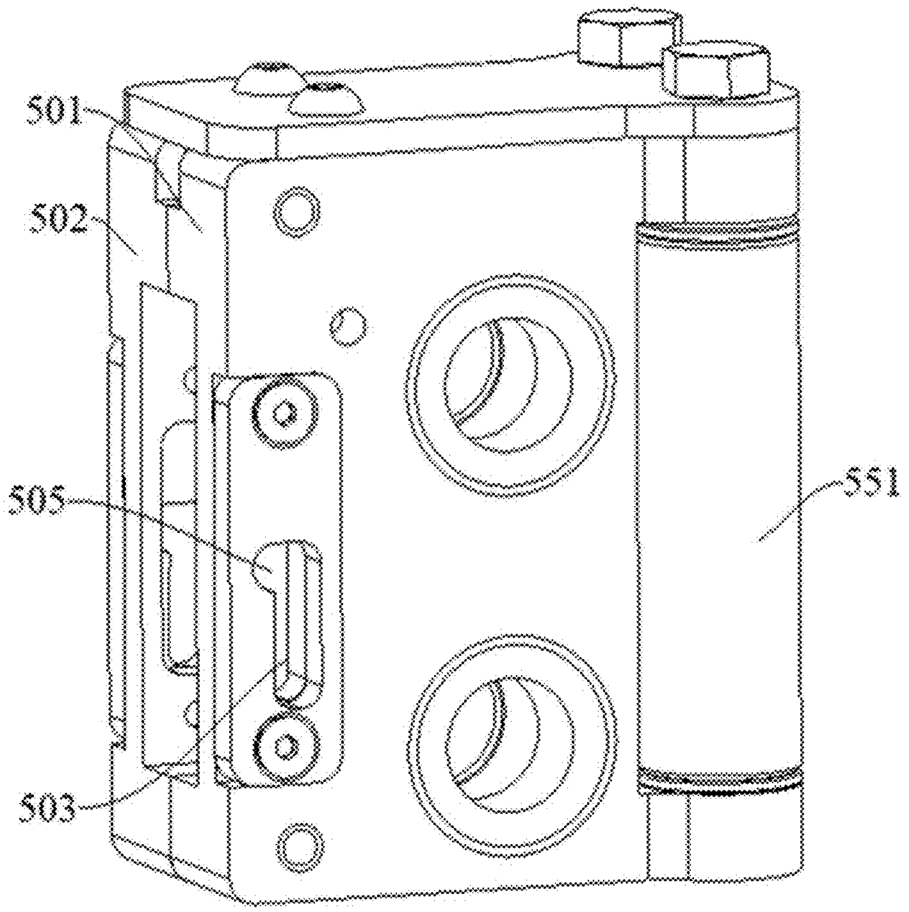
FIG. 13 is a perspective view illustrating that a sliding block and a guide roller are fitted together according to an embodiment of the present disclosure, in which a first elongated slot and a first recess are illustrated.
Figure 14:
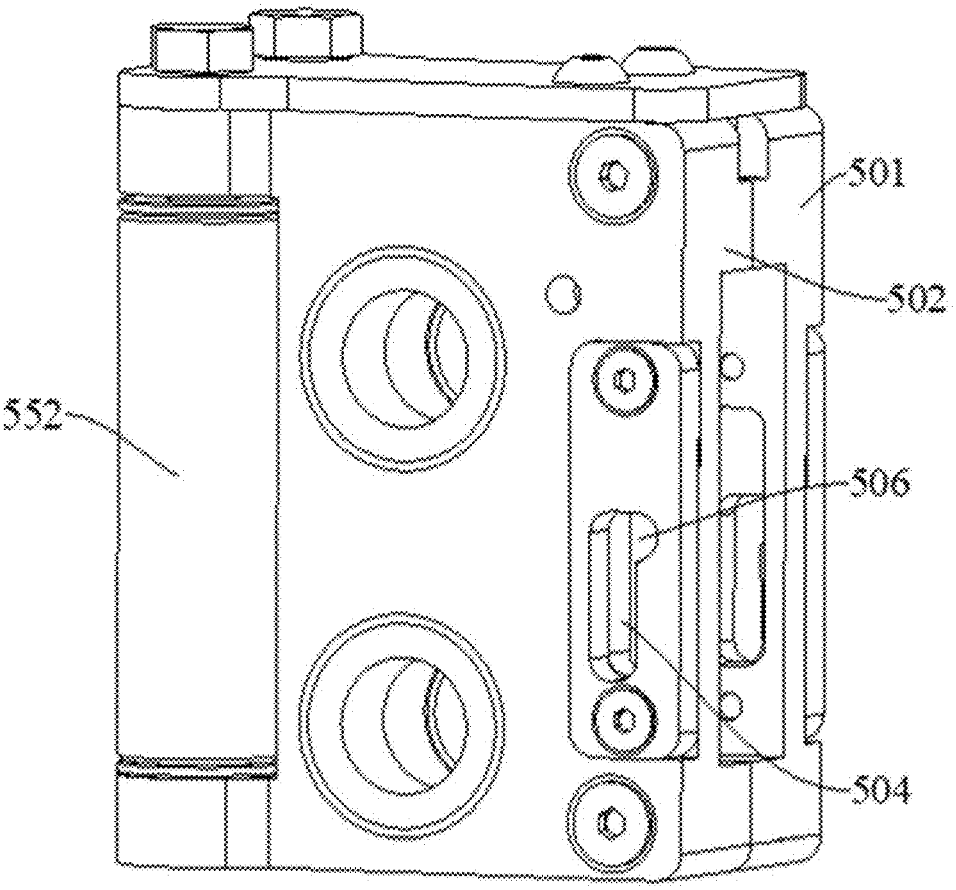
FIG. 14 is a perspective view illustrating that a sliding block and a guide roller are fitted together according to an embodiment of the present disclosure, in which a second elongated slot and a second recess are illustrated.

In some embodiments, as illustrated in FIGS. 13 and 14, the sliding block 50 has a first side wall 501 and a second side wall 502 opposite to each other in the left-right direction. The first side wall 501 is provided with a first elongated slot 503 extending in the up-down direction, and the second side wall 502 is provided with a second elongated slot 504 extending in the up-down direction. The rope-arranging sheave shaft 52 has a first end 521 fitted with the first elongated slot 503 and extending out of the first elongated slot 503 to be connected with the adjustment handle 54, and it has a second end 522 fitted with the second elongated slot 504 and extending out of the second elongated slot 504 to be connected with the adjustment handle 54.

An upper end of the first elongated slot 503 is provided with a first recess 505 extending rearwards, and an upper end of the second elongated slot 504 is provided with a second recess 506 extending rearwards. In the tensioned position, the first end of the rope-arranging sheave shaft 52 is fitted in the first recess 505, and the second end of the rope-arranging sheave shaft 52 is fitted in the second recess 506. In the release position, the first end of the rope-arranging sheave shaft 52 is fitted in a lower end of the first elongated slot 503, and the second end of the rope-arranging sheave shaft 52 is fitted in a lower end of the second elongated slot 504.

It could be understood that, as illustrated in FIGS. 11-14, when the first end 521 of the rope-arranging sheave shaft 52 is located in the first recess 505 and the second end 522 of the rope-arranging sheave shaft 52 is located in the second recess 506, the rope-arranging sheave 53 is in the tensioned position where the rope L is tensioned, so that when the rope L is wound around the reel 2 (rope retraction) with the free end L1 of the rope L under no load (i.e., an unloaded state), the rope-arranging sheave 53 tensions the rope, so that the rope L is not slack and will not be messed up.

Figure 11:
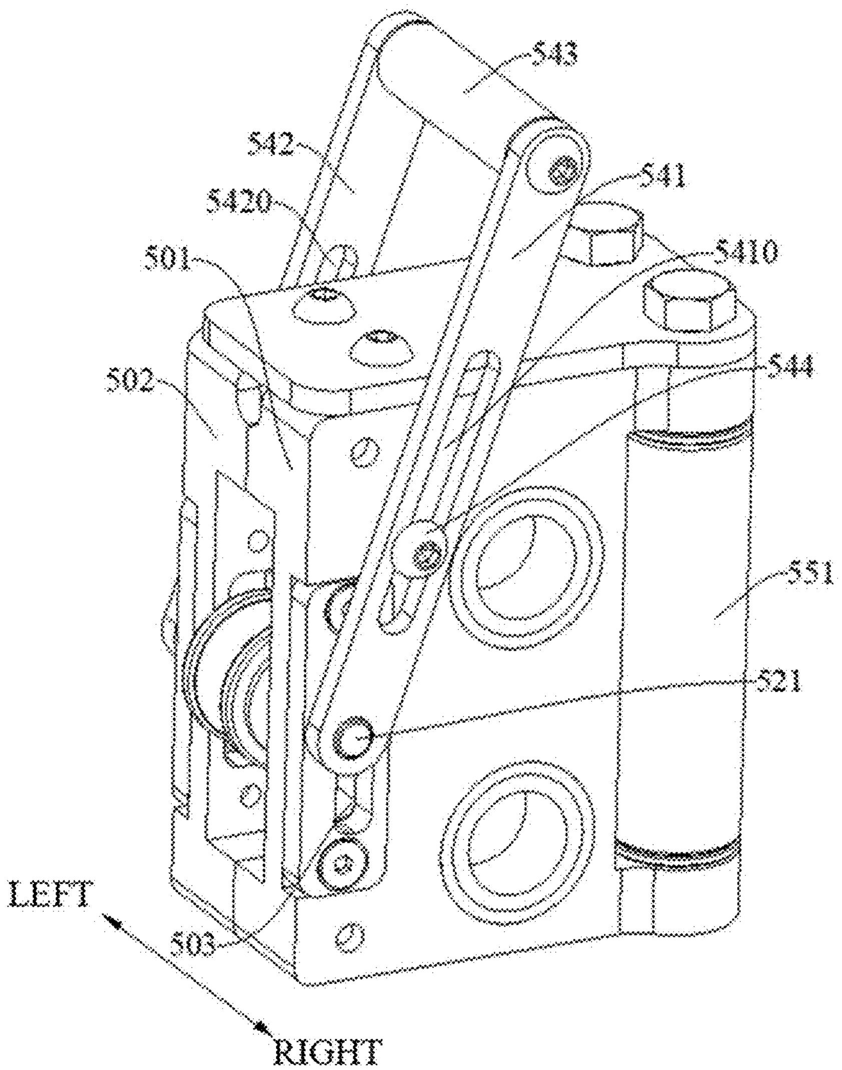
FIG. 11 is a perspective view of a rope guide according to an embodiment of the present disclosure, in which a first guide pin shaft and a first guide groove are illustrated, but a guide shaft is not illustrated.
Figure 12:
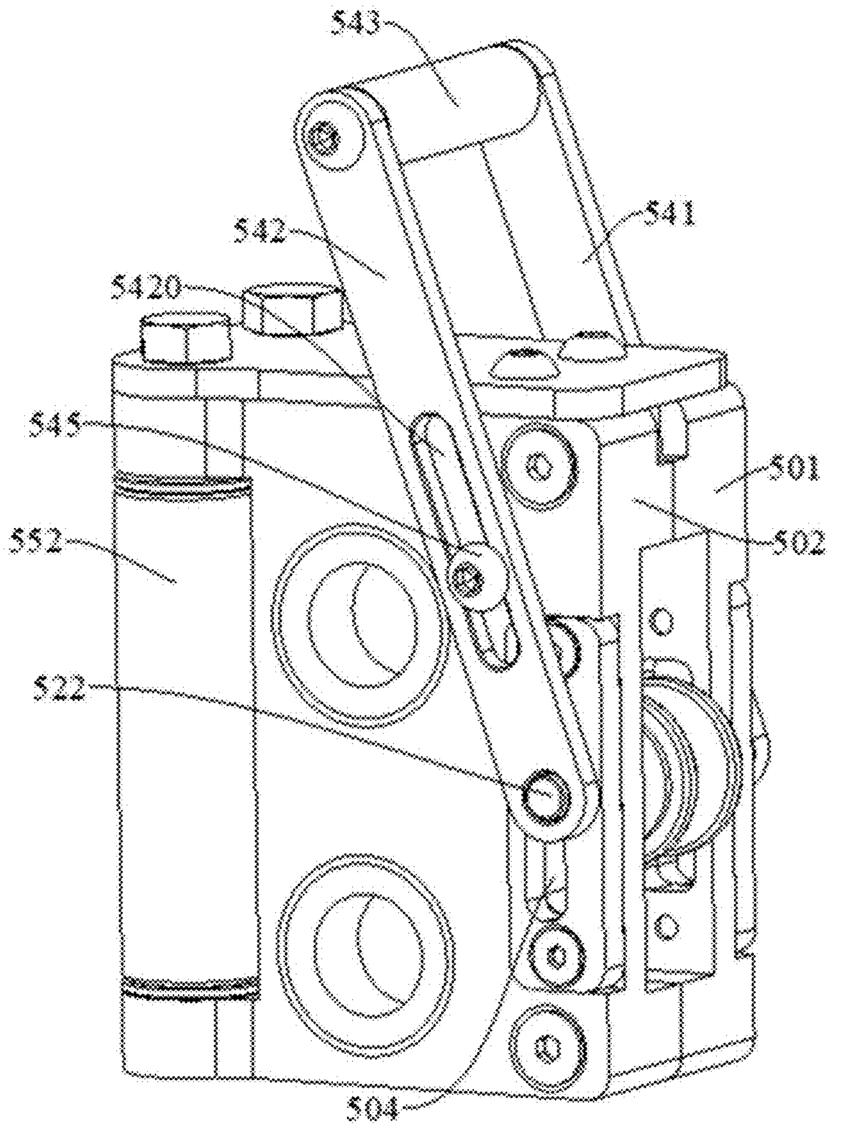
FIG. 12 is a perspective view of a rope guide according to an embodiment of the present disclosure, in which a second guide pin shaft and a second guide groove are illustrated, but a guide shaft is not illustrated.

In some embodiments, the adjustment handle 54 includes a first side plate 541, a second side plate 542, and a grip 543. An upper end of the first side plate 541 and an upper end of the second side plate 542 are both connected to the grip 543; a lower end of the first side plate 541 is connected with the first end 521 of the rope-arranging sheave shaft 52, and a lower end of the second side plate 542 is connected with the second end 522 of the rope-arranging sheave shaft 52. In other words, as illustrated in FIGS. 11 and 12, one end of the first side plate 541 is connected to the first end 521 of the rope-arranging sheave shaft 52, and the first side plate 541 extends upwards and is inclined forwards. One end of the second side plate 542 is connected to the second end 522 of the rope-arranging sheave shaft 52, and the second side plate 542 extends upwards and is inclined forwards. The first side plate 541 and the second side plate 542 are disposed opposite to each other and in parallel. The grip 543 is located between the upper end of the first side plate 541 and the upper end of the second side plate 542. One end of the grip 543 is connected to a left side face of the first side plate 541, and the other end of the grip 543 is connected to a right side face of the second side plate 542 adjacent to the first side plate 541.

The first side plate 541 is provided with a first sliding guide groove 5410 extending along a length direction of the first side plate 541, and the second side plate 542 is provided with a second sliding guide groove 5420 extending along a length direction of the second side plate 542. An outer wall face of the first side wall 501 of the sliding block 50 (e.g., a right wall face of the first side wall 501 illustrated in FIG. 11) is provided with a first guide pin shaft 544 fitted with the first sliding guide groove 5410, and an outer wall face of the second side wall 502 of the sliding block 50 (e.g., a left wall face of the second side wall 502 illustrated in FIG. 11) is provided with a second guide pin shaft 545 fitted with the second sliding guide groove 5420.

In other words, as illustrated in FIGS. 11 and 12, the first sliding guide groove 5410 penetrates the thickness of the first side plate 541 and extends along the length direction of the first side plate 541. The second sliding guide groove 5420 penetrates the thickness of the second side plate 542 and extends along the length direction of the second side plate 542. The first guide pin shaft 544 is located in front of and above the lower end of the first side plate 541, and the second guide pin shaft 545 is located in front of and above the lower end of the second side plate 542.

Each of the first guide pin shaft 544 and the second guide pin shaft 545 includes a base body and a flange. The base body of the first guide pin shaft 544 is fitted in the first sliding guide groove 5410, and the flange of the first guide pin shaft 544 is located on a right side of the first side plate 541, to allow the first side plate 541 to move forwards and upwards between the first side wall 501 and the flange of the first guide pin shaft 544. The base body of the second guide pin shaft 545 is fitted in the second sliding guide groove 5420, and the flange of the second guide pin shaft 545 is located on a left side of the second side plate 542, to allow the second side plate 542 to move forwards and upwards between the second side wall 502 and the flange of the second guide pin shaft 545.

It could be understood that by manipulating the grip 543, the rope-arranging sheave 53 may be moved between the tensioned position and the release position by means of the first side plate 541 and the second side plate 542. The base body of the first guide pin shaft 544 is slidable in the first sliding guide groove 5410, and the second guide pin shaft 545 is slidable in the second sliding guide groove 5420, so as to guide the movement of the first side plate 541 and the second side plate 542.

In some embodiments, the rope guide 5 further includes a guide roller 55. The guide roller 55 includes a first guide roller 551 and a second guide roller 552. The first guide roller 551 and the second guide roller 552 are mounted to the sliding block 50 and located at a front opening of the central cavity 500. The first guide roller 551 and the second guide roller 552 extend in the up-down direction and are spaced apart from each other in the left-right direction.

In other words, as illustrated in FIGS. 11-14, the first guide roller 551 and the second guide roller 552 both extend in the up-down direction and are spaced apart in the left-right direction. An upper end of the first guide roller 551 and an upper end of the second guide roller 552 are both mounted to a top wall of the sliding block 50, and a lower end of the first guide roller 551 and a lower end of the second guide roller 552 are both mounted on a bottom wall of the sliding block 50. Both the first guide roller 551 and the second guide roller 552 are rotatable about their respective axes. The distance between the first guide roller 551 and the second guide roller 552 spaced apart in the left-right direction should be equal to or smaller than the dimension of the central cavity 500 of the sliding block 50 in the left-right direction (i.e., a distance between an inner surface of the first side wall 501 and an inner surface of the second side wall 502), such that the rope L is guided between the first guide roller 551 and the second guide roller 552 and will not contact or rub against the first side wall 501 and the second side wall 502 of the sliding block 50.

In some embodiments, the rope guide 5 further includes a guide shaft 56, and the guide shaft 56 includes an upper guide shaft 561 and a lower guide shaft 562. The upper rope guiding drum 511 is rotatably mounted to the upper guide shaft 561 and is slidable along an axial direction of the upper guide shaft 561; the lower rope guiding drum 512 is rotatably mounted to the lower guide shaft 562 and is slidable along an axial direction of the lower guide shaft 562. The upper guide shaft 561 and the lower guide shaft 562 pass through the sliding block 50, and the sliding block 50 is slidable along the upper guide shaft 561 and the lower guide shaft 562.

Figure 10:
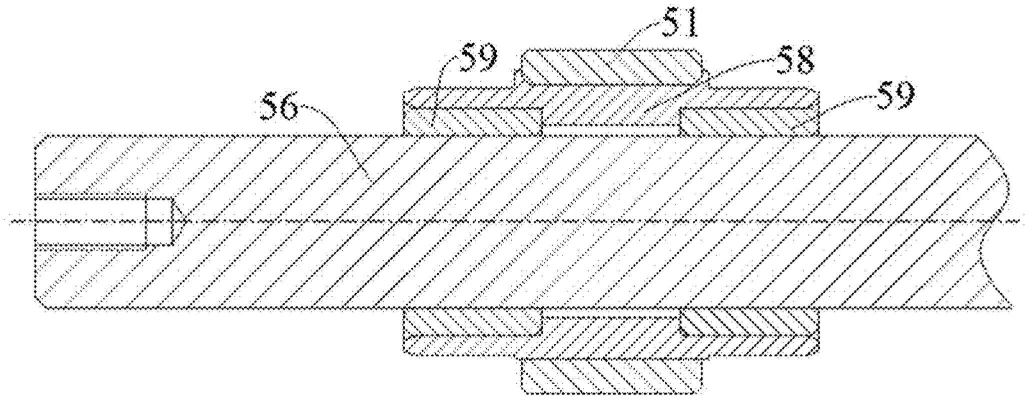
FIG. 10 is a sectional view illustrating that a guide shaft, a sliding sleeve, a bushing, and a rope guiding drum are fitted together according to an embodiment of the present disclosure.

In other words, as illustrated in FIGS. 8-10, the upper guide shaft 561 and the lower guide shaft 562 each extend in the left-right direction, so that the upper guide shaft 561 and the lower guide shaft 562 are parallel to each other. The upper guide shaft 561 sequentially passes through the first side wall 501, the upper rope guiding drum 511, and the second side wall 502. The lower guide shaft 562 sequentially passes through the first side wall 501, the lower rope guiding drum 512, and the second side wall 502. As illustrated in FIGS. 1 and 2, the lower guide shaft 562 is located below the upper guide shaft 561. In some embodiments, the rope guide 5 further includes a telescopic sheath 57. The telescopic sheath 57 includes a first upper telescopic sheath 571 and a second upper telescopic sheath 572 as well as a first lower telescopic sheath 573 and a second lower telescopic sheath 574. The first upper telescopic sheath 571 is fitted over a first end of the upper guide shaft 561 (e.g., a left end of the upper guide shaft 561 illustrated in FIG. 1), and the second upper telescopic sheath 572 is fitted over a second end of the upper guide shaft 561 (e.g., a right end of the upper guide shaft 561 illustrated in FIG. 1); the first lower telescopic sheath 573 is fitted over a first end of the lower guide shaft 562 (e.g., a left end of the lower guide shaft 562 illustrated in FIG. 1), and the second lower telescopic sheath 574 is fitted over a second end of the lower guide shaft 562 (e.g., a right end of the lower guide shaft 562 illustrated in FIG. 1).

In other words, the upper guide shaft 561 is provided with two telescopic sheaths, and the sheaths are located at the left and right sides of the sliding block 50; the lower guide shaft 562 is also provided with two telescopic sheaths, and the sheaths are located at the left and right sides of the sliding block 50. When the sliding block 50 is adjacent to the left end of the upper guide shaft 561 and the left end of the lower guide shaft 562, the sheath at the left side of the sliding block 50 is compressed, and the sheath at the right side of the sliding block 50 is extended, as illustrated in FIG. 1.

In some embodiments, the rope guide 5 further includes a sliding sleeve 58. The sliding sleeve 58 includes an upper sliding sleeve 581 and a lower sliding sleeve 582. The upper sliding sleeve 581 and the lower sliding sleeve 582 are provided in the sliding block 50 and penetrate the sliding block 50. The upper sliding sleeve 581 and the lower sliding sleeve 582 are opposite to and spaced apart from each other. In other words, as illustrated in FIG. 9, the upper sliding sleeve 581 and the lower sliding sleeve 582 both extend in the left-right direction and are spaced apart from each other in the up-down direction, and one end of the upper sliding sleeve 581 and one end of the lower sliding sleeve 582 are mounted to the first side wall 501, while the other end of the upper sliding sleeve 581 and the other end of the lower sliding sleeve 582 are mounted to the second side wall 502.

The upper rope guiding drum 511 is rotatably fitted over the upper sliding sleeve 581. The upper guide shaft 561 passes through the upper sliding sleeve 581, and the upper sliding sleeve 581 is slidable along the axial direction of the upper guide shaft 561. The lower rope guiding drum 512 is rotatably fitted over the lower sliding sleeve 582. The lower guide shaft 562 passes through the lower sliding sleeve 582, and the lower sliding sleeve 582 is slidable along the axial direction of the lower guide shaft 562.

In other words, as illustrated in FIG. 9, the upper sliding sleeve 581 is fitted over the upper guide shaft 561 and is slidable in the left-right direction with respect to the upper guide shaft 561. The upper rope guiding drum 511 is fitted over the upper sliding sleeve 581 and is rotatable with respect to the upper sliding sleeve 581. The lower sliding sleeve 582 is fitted over the lower guide shaft 562 and is slidable in the left-right direction with respect to the lower guide shaft 562. The lower rope guiding drum 512 is fitted over the lower sliding sleeve 582 and is rotatable with respect to the lower sliding sleeve 582.

In one example, the rope guide 5 further includes a bushing 59. The bushing 59 includes an upper bushing 591 and a lower bushing 592. The upper bushing 591 and the lower bushing 592 are opposite to and spaced apart from each other. The upper bushing 591 is fitted in the upper sliding sleeve 581, the upper guide shaft 561 passes through the upper bushing 591, and the upper bushing 591 is slidable with respect to the axial direction of the upper guide shaft 561. The lower bushing 592 is fitted in the lower sliding sleeve 582, the lower guide shaft 562 passes through the lower bushing 592, and the lower bushing 592 is slidable with respect to the lower guide shaft 562.

As illustrated in FIG. 9, two upper bushings 591 are provided and spaced apart in the left-right direction: one of the upper bushings 591 is fitted to a left end of the upper sliding sleeve 581, and the other one of the upper bushings 591 is fitted to a right end of the upper sliding sleeve 581. The upper guide shaft 561 passes through the two upper bushings 591 sequentially.

Two lower bushings 592 are provided and spaced apart in the left-right direction: one of the lower bushings 592 is fitted to a left end of the lower sliding sleeve 582, and the other one of the lower bushings 592 is fitted to a right end of the lower sliding sleeve 582. The lower guide shaft 562 passes through the two lower bushings 592 sequentially.

In some embodiments, the sliding block 50 is connected with the sleeve body 41 by a safety pin 6. The sliding block 50 and the sleeve body 41 are connected by the safety pin 6, and after the load is greater than the strength bearable by the transmission shaft 42, the safety pin 6 can be broken to interrupt the power transmission between the transmission shaft 42 and the sliding block 50, and the transmission shaft 42 can no longer drive the sliding block 50 to move in the left-right direction, thereby ensuring the safety of the transmission shaft 42.

Figure 3:
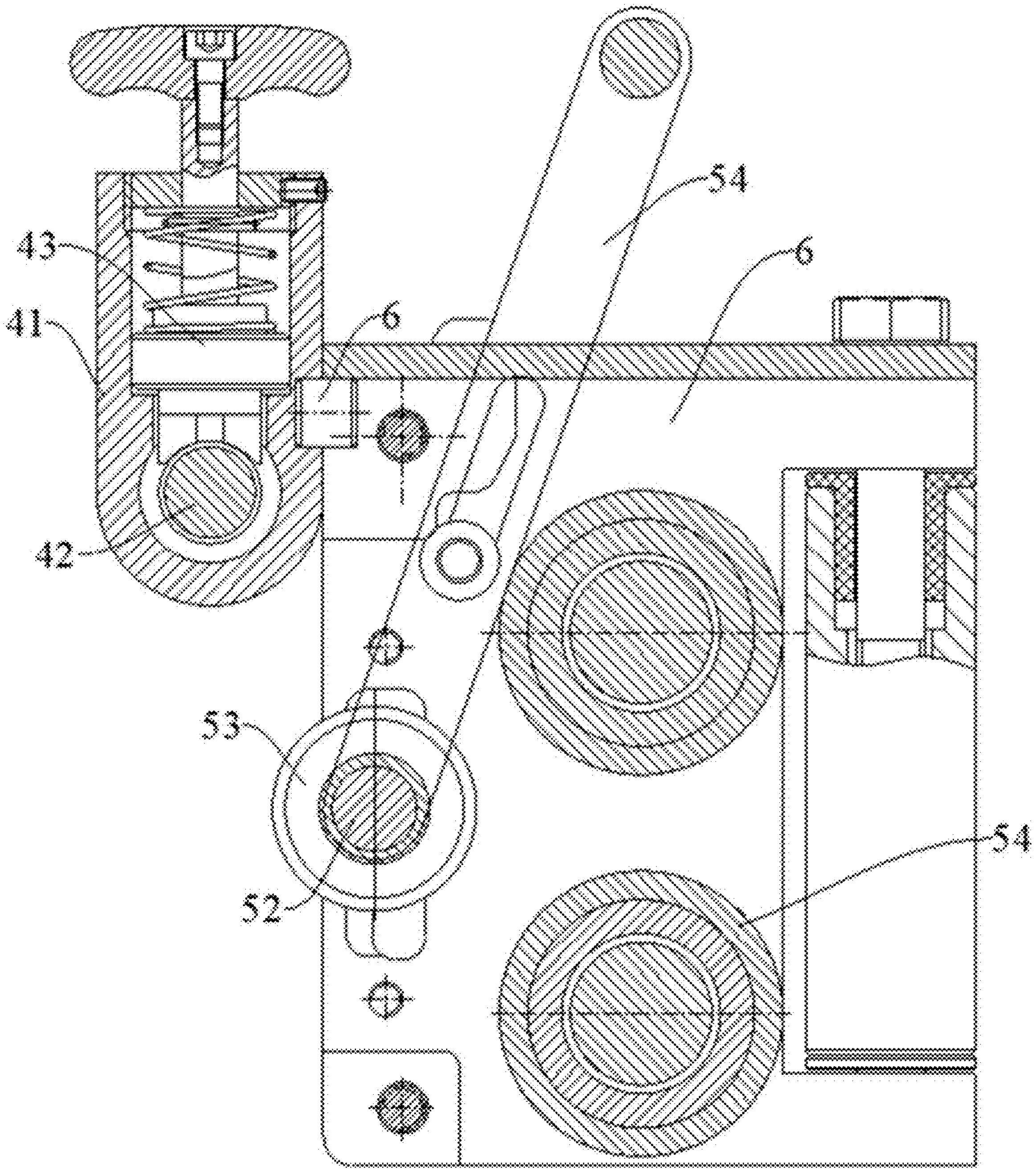
FIG. 3 is a sectional view of a rope guiding apparatus according to an embodiment of the present disclosure.

In embodiments of the present disclosure, as illustrated in FIGS. 1-3, the base seat 1, the transmission device 4, and the rope guide 5 constitute a rope guiding apparatus.

Figure 4:
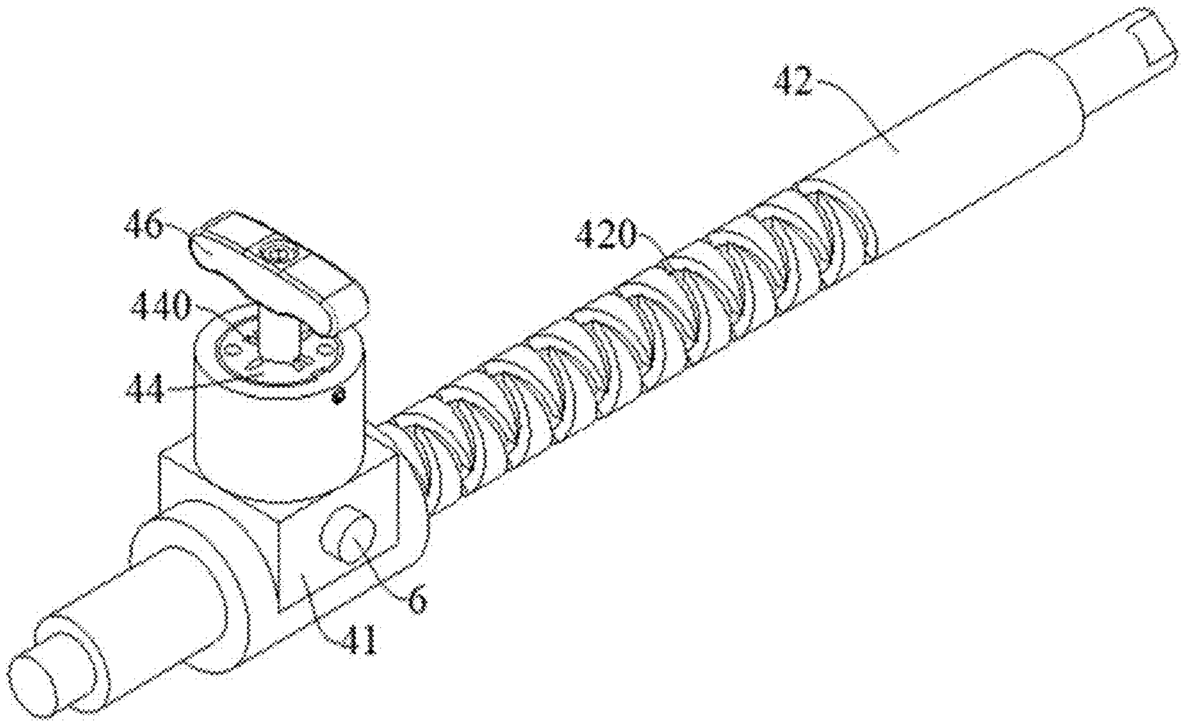
FIG. 4 is a sectional view of a transmission device according to an embodiment of the present disclosure.

In some embodiments, as illustrated in FIGS. 1 and 4, the base seat 1 includes a first base plate 11 and a second base plate 12 opposite to each other and spaced apart in the left-right direction, and one end of the transmission shaft 42 is mounted to the first base plate 11 while the other end of the transmission shaft 42 is mounted to the second base plate 12.

One end of the upper guide shaft 561 is mounted to the first base plate 11, and the other end of the upper guide shaft 561 sequentially passes through the first side wall 501, the upper rope guiding drum 511, and the second side wall 502, and it is mounted to the second base plate 12. One end of the lower guide shaft 562 is also mounted to the first base plate 11, and the other end of the lower guide shaft 562 sequentially passes through the first side wall 501, the lower rope guiding drum 512, and the second side wall 502, and it is mounted to the second base plate 12.

The operation of the winch according to embodiments of the present disclosure will now be described with reference to FIGS. 15-18.

Figure 15:
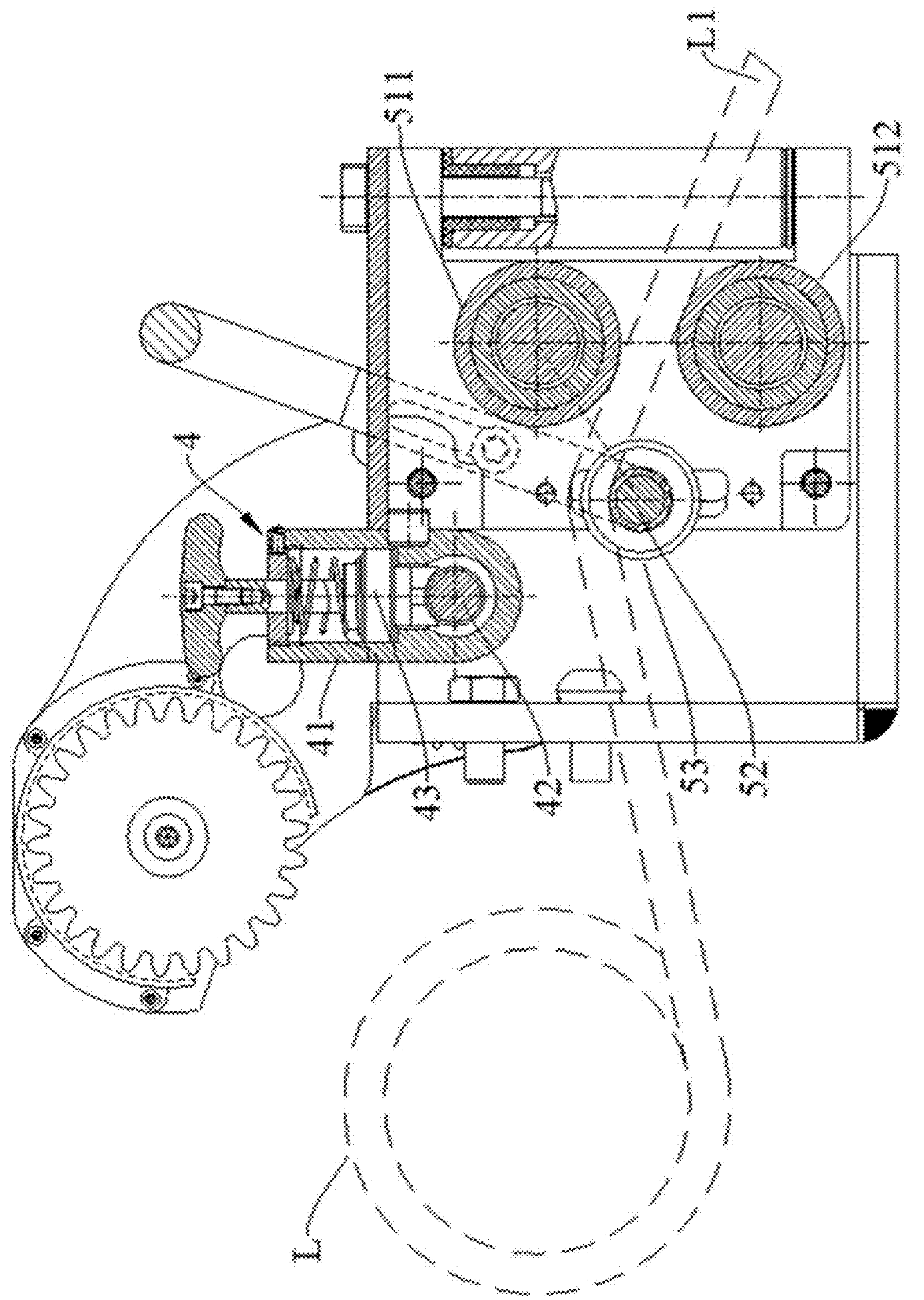
FIG. 15 is a sectional view of a winch according to an embodiment of the present disclosure, illustrating a state of a rope L when the rope is retracted under no load.

When the free end L1 of the rope L is under no load and the rope L needs to be wound around the reel 2 (e.g., rope retraction under no load), as illustrated in FIG. 15, the engagement plate 433 of the clutch member 43 is engaged with the spiral groove 420 of the transmission shaft 42 to allow the sleeve body 41 to be driven by the transmission shaft 42, so as to move the sliding block 50 in the left-right direction. Both ends of the rope-arranging sheave shaft 52 are located in the first recess 505 and the second recess 506 respectively, so that the rope-arranging sheave 53 is in the tensioned position, thereby tensioning the rope L. In other words, a part of the rope L located between the reel 2 and the lower rope guiding drum 512 is curved.

The rope L bypasses the rope-arranging sheave 53 from above the rope-arranging sheave 53, and passes between the upper rope guiding drum 511 and the lower rope guiding drum 512. Since the highest point of the rope-arranging face of the rope-arranging sheave 53 is higher than the lowest point of the rope guiding face of the upper rope guiding drum 511, the rope L is tensioned and tidily wound around the reel 2.

Figure 16:
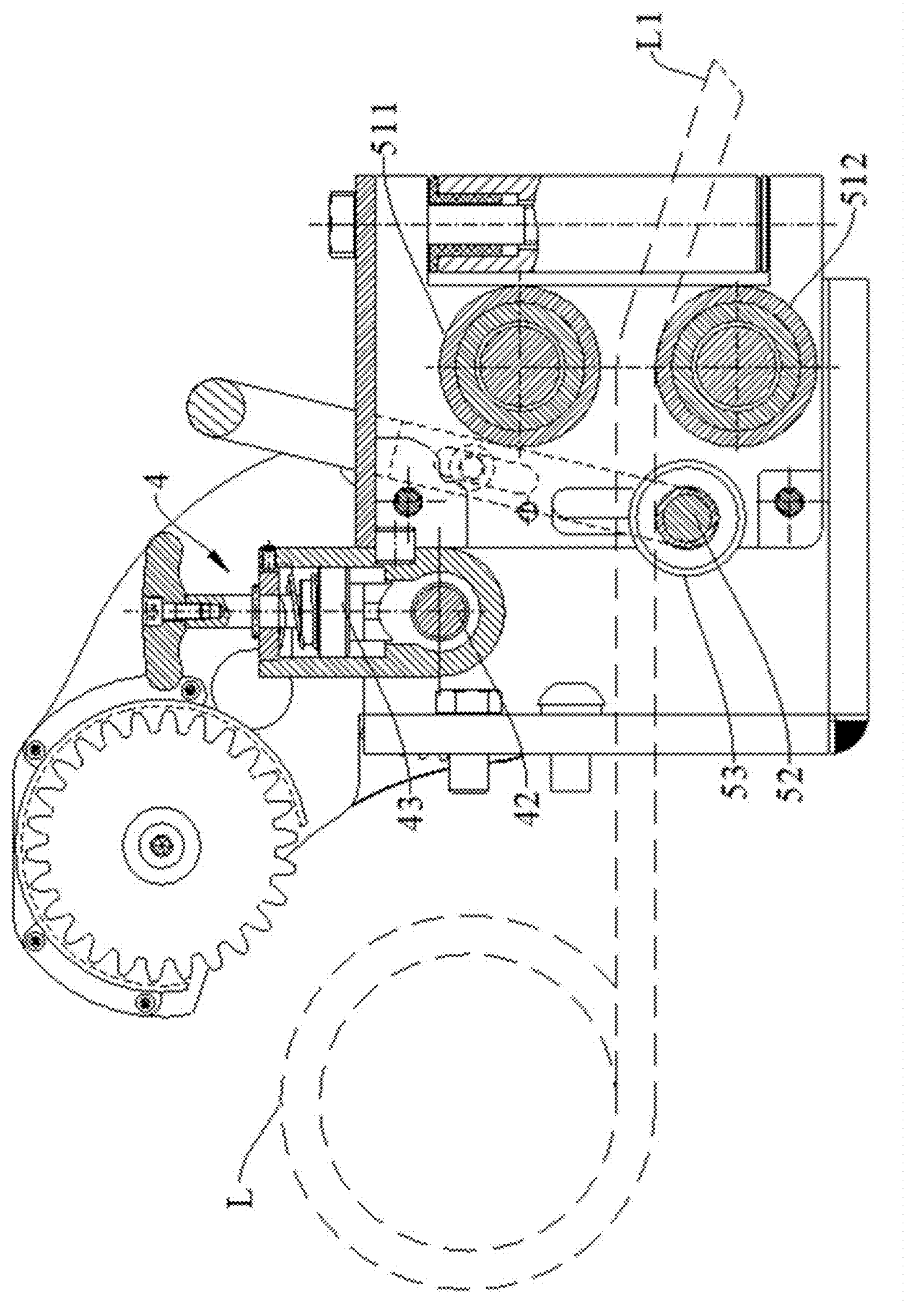
FIG. 16 is a sectional view of a winch according to an embodiment of the present disclosure, illustrating a state of a rope L when the rope is released under no load.

When the free end L1 of the rope L is under no load and the rope L needs to be unwound from the reel 2 (e.g., rope release under no load), as illustrated in FIG. 16, the engagement plate 433 of the clutch member 43 is disengaged from the spiral groove 420 of the transmission shaft 42, so that the transmission shaft 42 can no longer drive the sliding block 50 to move. Both ends of the rope-arranging sheave shaft 52 are located in the lower ends of the first elongated slot 503 and the second elongated slot 504 respectively, so that the rope-arranging sheave 53 is in the release position. The rope L bypasses the rope-arranging sheave 53 and passes between the upper rope guiding drum 511 and the lower rope guiding drum 512, and the highest point of the rope-arranging face of the rope-arranging sheave 53 is lower than the highest point of the rope guiding face of the lower rope guiding drum 512 or is substantially flush with the highest point of the rope guiding face of the lower rope guiding drum 512.

Figure 17:
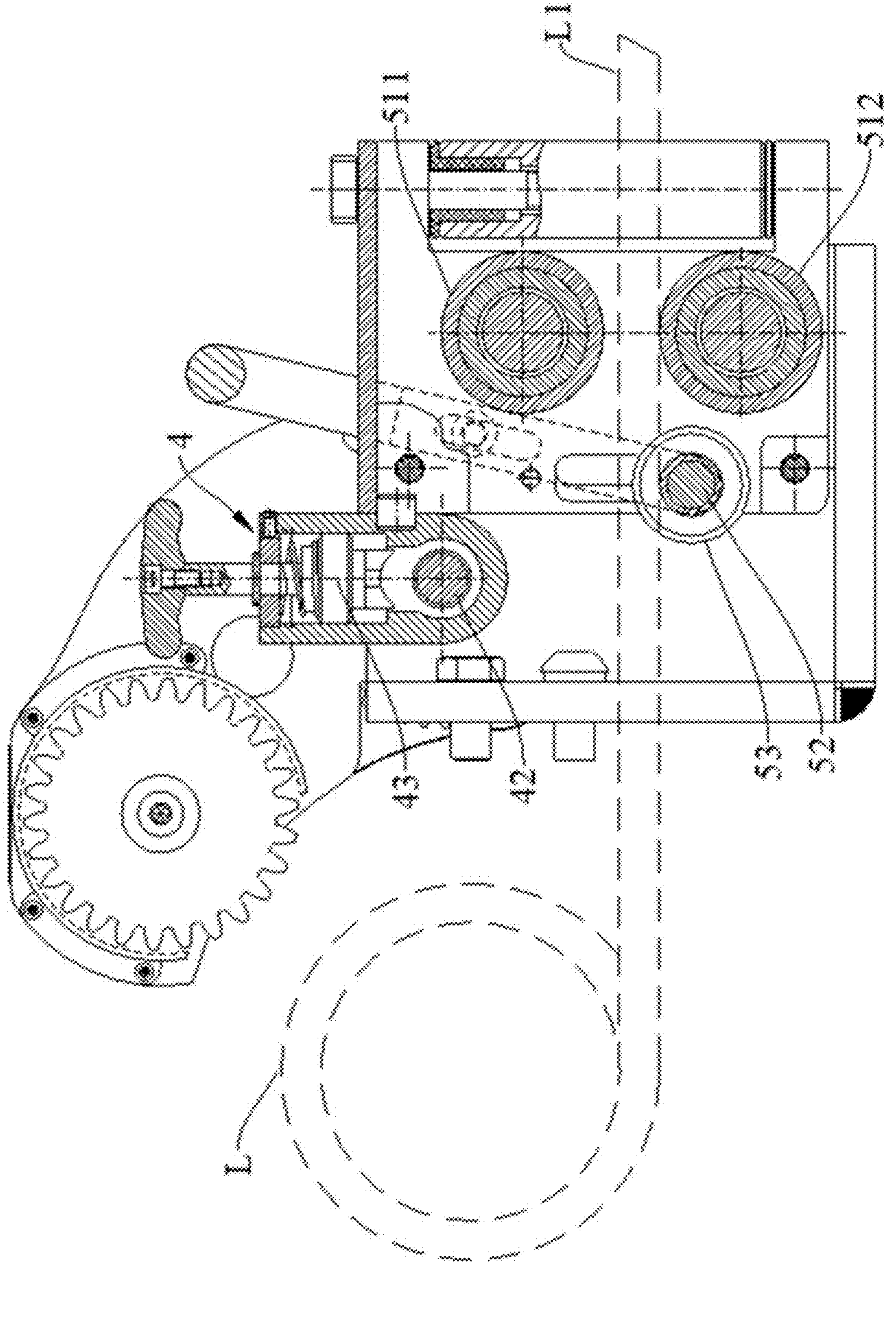
FIG. 17 is a sectional view of a winch according to an embodiment of the present disclosure, illustrating a state of a rope L when the rope is retracted under a load.

When the free end L1 of the rope L is under a relatively large load (exceeding the strength bearable by the transmission shaft 42), and the rope L needs to be wound around the reel 2 (rope retraction under a load), as illustrated in FIG. 17, the engagement plate 433 of the clutch member 43 is disengaged from the spiral groove 420 of the transmission shaft 42, so that the transmission shaft 42 can no longer drive the sliding block 50 to move, thereby protecting the safety of the transmission shaft 42. Both ends of the rope-arranging sheave shaft 52 are located in the lower ends of the first elongated slot 503 and the second elongated slot 504 to bring the rope-arranging sheave 53 into the release position. The rope L bypasses the rope-arranging sheave 53 and passes between the upper rope guiding drum 511 and the lower rope guiding drum 512, and the highest point of the rope-arranging face of the rope-arranging sheave 53 is lower than the highest point of the rope guiding face of the lower rope guiding drum 512 or is substantially flush with the highest point of the rope guiding face of the lower rope guiding drum 512.

Figure 18:
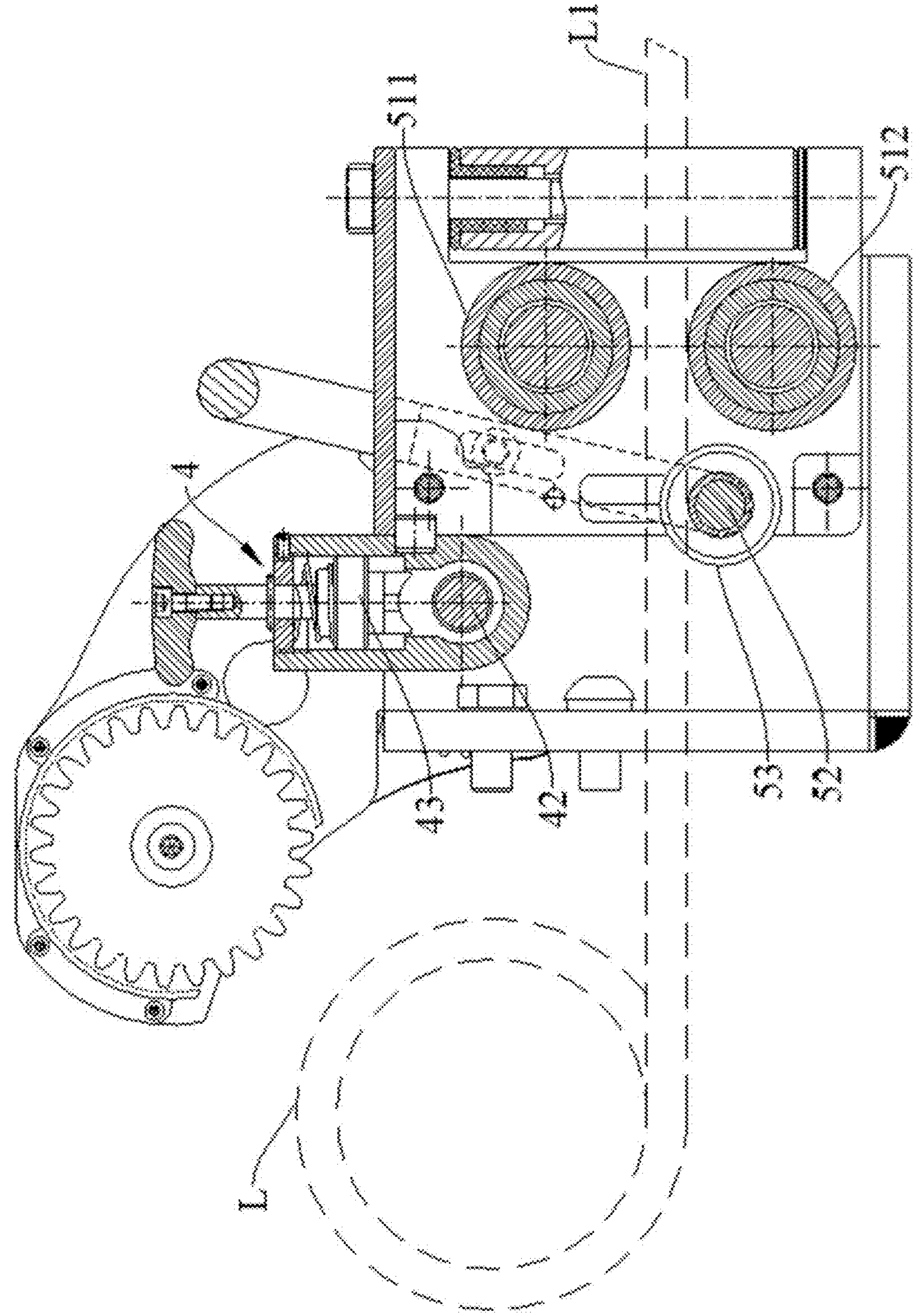
FIG. 18 is a sectional view of a winch according to an embodiment of the present disclosure, illustrating a state of a rope L when the rope is released under a load.

When the free end L1 of the rope L is under a relatively large load (exceeding the strength bearable by the transmission shaft 42), and the rope L needs to be unwound from the reel 2 (rope release under a load), as illustrated in FIG. 18, the engagement plate 433 of the clutch member 43 is disengaged from the spiral groove 420 of the transmission shaft 42, so that the transmission shaft 42 can no longer drive the sliding block 50 to move. Both ends of the rope-arranging sheave shaft 52 are located in the lower ends of the first elongated slot 503 and the second elongated slot 504 to bring the rope-arranging sheave 53 into the release position. The rope L bypasses the rope-arranging sheave 53 and passes between the upper rope guiding drum 511 and the lower rope guiding drum 512, and the highest point of the rope-arranging face of the rope-arranging sheave 53 is lower than the highest point of the rope guiding face of the lower rope guiding drum 512 or is substantially flush with the highest point of the rope guiding face of the lower rope guiding drum 512.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Additionally, different embodiments or examples as well as features in different embodiments or examples described in the present disclosure can be combined by those skilled in the art without any contradiction.

In the present disclosure, unless specified or limited otherwise, the terms "mounted," "connected," "coupled," "fixed," "provided," and the like are used broadly, and may be, for example, fixed connections, detachable connections, or integral connections; may also be mechanical or electrical connections or mutual communication; may also be direct connections or indirect connections via intervening structures; may also be inner communications of two elements or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Although embodiments of the present disclosure have been shown and described, it would be appreciated by those skilled in the art that the above embodiments are explanatory and cannot be construed to limit the present disclosure, and changes, modifications, alternatives, and variations can be made in the above embodiments without departing from the scope of the present disclosure.

It is intended that the specification, together with the drawings, be considered exemplary only, where exemplary means an example. As used herein, the singular forms "a," "an," and "the" are intended to include the plural forms as well, unless the context clearly indicates otherwise. Additionally, the use of "or" is intended to include "and/or," unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A rope guide, comprising:

a sliding block having a central cavity penetrating the sliding block in a front-rear direction, and having a first side wall and a second side wall opposite to each other in a left-right direction;

an upper rope guiding drum rotatably set in the central cavity;

a lower rope guiding drum rotatably set in the central cavity, and opposite to and spaced apart from the upper rope guiding drum;

a rope-arranging sheave shaft;

a rope-arranging sheave rotatably mounted to the rope-arranging sheave shaft and located in the central cavity; and an adjustment handle connected with the rope-arranging sheave shaft to adjust the rope-arranging sheave between a tensioned position where a rope is tensioned and a release position where the rope is released, wherein the adjustment handle comprises a first side plate, a second side plate, and a grip;

a first upper end of the first side plate and a second upper end of the second side plate are both connected to the grip; the first side plate has a first lower end connected with the first end of the rope-arranging sheave shaft, and the second side plate has a second lower end connected with the second end of the rope-arranging sheave shaft, the first side plate is provided with a first sliding guide groove extending along a first length direction of the first side plate, and the second side plate is provided with a second sliding guide groove extending along a second length direction of the second side plate, a first outer wall face of the first side wall of the sliding block is provided with a first guide pin shaft fitted with the first sliding guide groove, and a second outer wall face of the second side wall of the sliding block is provided with a second guide pin shaft fitted with the second sliding guide groove.

2. The rope guide according to claim 1, wherein a central axis of the lower rope guiding drum is aligned with a central axis of the upper rope guiding drum in an up-down direction, and the rope-arranging sheave is arranged behind the upper rope guiding drum and the lower rope guiding drum.

3. The rope guide according to claim 1, wherein in the tensioned position, a highest point of a rope-arranging face of the rope-arranging sheave is higher than a lowest point of a rope guiding face of the upper rope guiding drum, and wherein, in the release position, the highest point of the rope-arranging face of the rope-arranging sheave is lower than the highest point of a rope guiding face of the lower rope guiding drum or is flush with the highest point of the rope guiding face of the lower rope guiding drum.

4. The rope guide according to claim 1, wherein the first side wall is provided with a first elongated slot extending in an up-down direction, and the second side wall is provided with a second elongated slot extending in the up-down direction, and wherein the rope-arranging sheave shaft has a first end fitted with the first elongated slot and extending out of the first elongated slot to be connected with the adjustment handle, and has a second end fitted with the second elongated slot and extending out of the second elongated slot to be connected with the adjustment handle.

5. The rope guide according to claim 4, wherein the first elongated slot has a first upper end provided with a first recess extending rearwards, and the second elongated slot has a second upper end provided with a second recess extending rearwards, wherein in the tensioned position, the first end of the rope-arranging sheave shaft is fitted in the first recess, and the second end of the rope-arranging sheave shaft is fitted in the second recess, and wherein, in the release position, the first end of the rope-arranging sheave shaft is fitted in a first lower end of the first elongated slot, and the second end of the rope-arranging sheave shaft is fitted in a second lower end of the second elongated slot.

6. The rope guide according to claim 1, further comprising an upper guide shaft, a lower guide shaft, a first guide roller, and a second guide roller, wherein the first guide roller and the second guide roller are mounted to the sliding block and located at a front opening of the central cavity; the first guide roller and the second guide roller extend in an up-down direction and are spaced apart from each other in the left-right direction; the upper rope guiding drum is rotatably mounted to the upper guide shaft and is slidable along a first axial direction of the upper guide shaft; the lower rope guiding drum is rotatably mounted to the lower guide shaft and is slidable along a second axial direction of the lower guide shaft; the upper guide shaft and the lower guide shaft pass through the sliding block, and the sliding block is slidable along the upper guide shaft and the lower guide shaft.

* * * * *